US012543983B2

(12) United States Patent
Chaysinh et al.

(10) Patent No.: US 12,543,983 B2
(45) Date of Patent: Feb. 10, 2026

(54) SYSTEMS AND METHODS FOR EMOTION PREDICTION

(71) Applicant: Verizon Patent and Licensing Inc., Basking Ridge, NJ (US)

(72) Inventors: Stephane Chaysinh, Mendham, NJ (US); Jay Cee Straley, Simi Valley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 685 days.

(21) Appl. No.: 18/081,754

(22) Filed: Dec. 15, 2022

(65) Prior Publication Data

US 2024/0197219 A1      Jun. 20, 2024

(51) Int. Cl.
*A61B 5/16*     (2006.01)
*G06V 40/16*     (2022.01)

(52) U.S. Cl.
CPC ............ *A61B 5/165* (2013.01); *G06V 40/174* (2022.01)

(58) Field of Classification Search
None
See application file for complete search history.

(56) References Cited

U.S. PATENT DOCUMENTS

2020/0275873 A1*   9/2020   Xu ........................ G06V 40/20
2023/0230228 A1*   7/2023   Liu ...................... G06V 10/761

OTHER PUBLICATIONS

Huang Y, Yang J, Liao P, Pan J. (Non-Patent Literature, Fusion of Facial Expressions and EEG for Multimodal Emotion Recognition. Comput Intell Neurosci. 2017;2017:2107451. doi: 10.1155/2017/2107451. Epub Sep. 19, 2017. PMID: 29056963; PMCID: PMC5625811 (Year: 2017).*

* cited by examiner

*Primary Examiner* — Gabriel Mercado

(57) ABSTRACT

One or more computing devices, systems, and/or methods determining emotion predictions and/or confidence scores are provided. In an example, a first emotion prediction associated with a person is determined based upon one or more neural signals collected via a brain-computer interface (BCI). A second emotion prediction associated with the person is determined based upon a facial expression of the person. An enhanced emotion prediction associated with the person is determined based upon the first emotion prediction and the second emotion prediction. A confidence score of the enhanced emotion prediction is determined based upon the first emotion prediction and the second emotion prediction. One or more actions are performed based upon the enhanced emotion prediction and the confidence score.

20 Claims, 14 Drawing Sheets

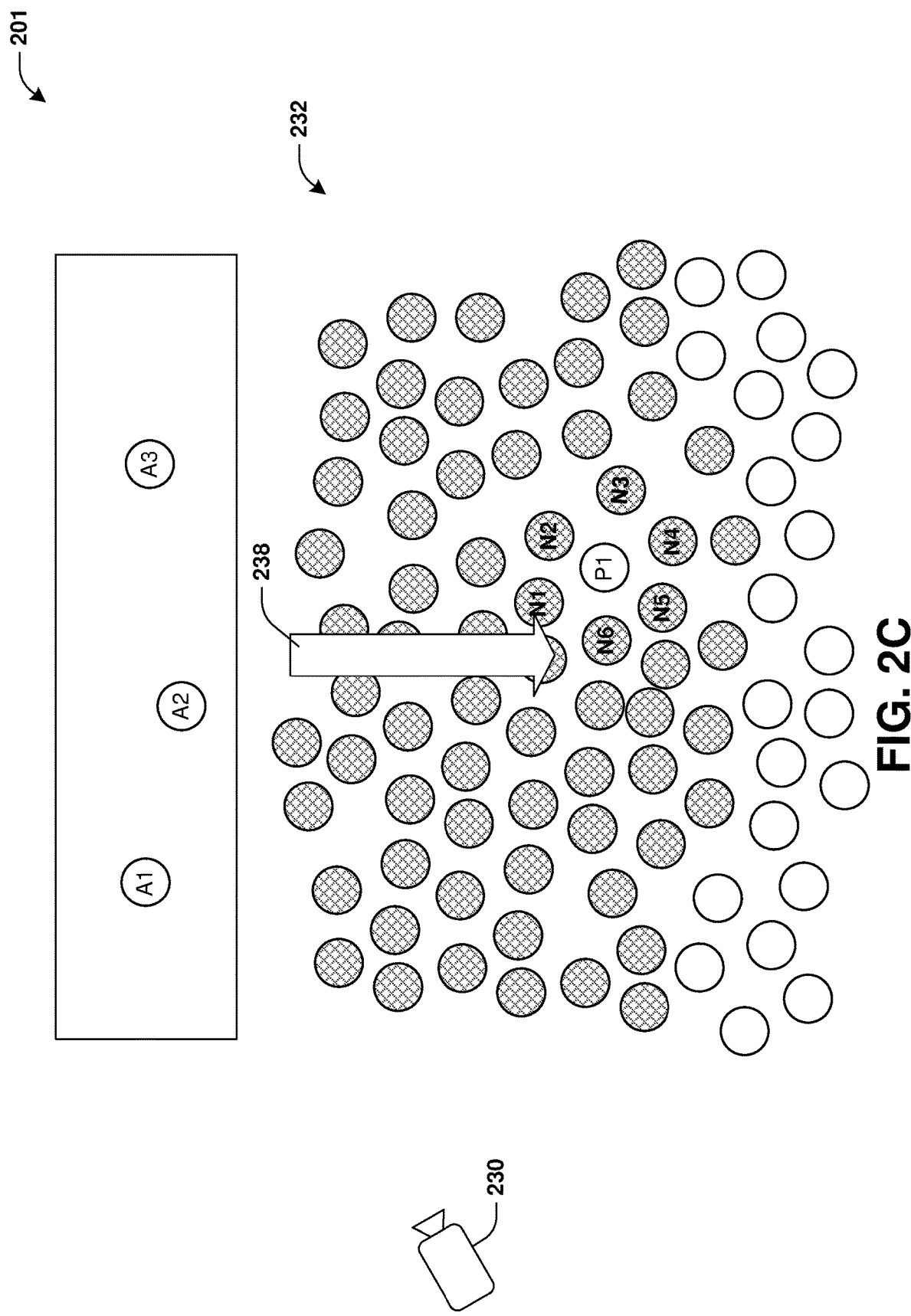

SYSTEMS AND METHODS FOR EMOTION PREDICTION

BACKGROUND

Services, such as websites, applications, etc. may provide platforms including social media platforms, communication platforms, etc. that facilitate interactions between users. In some platforms, users may interact with each other in virtual environments where it may be difficult for one user to sense an emotional response of another user.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 2C is a diagram illustrating an example system for determining a confidence score of an enhanced emotion prediction, where a group propagation of emotion in an event is identified according to some embodiments.

DETAILED DESCRIPTION OF EXAMPLE EMBODIMENTS

Figure 1A:
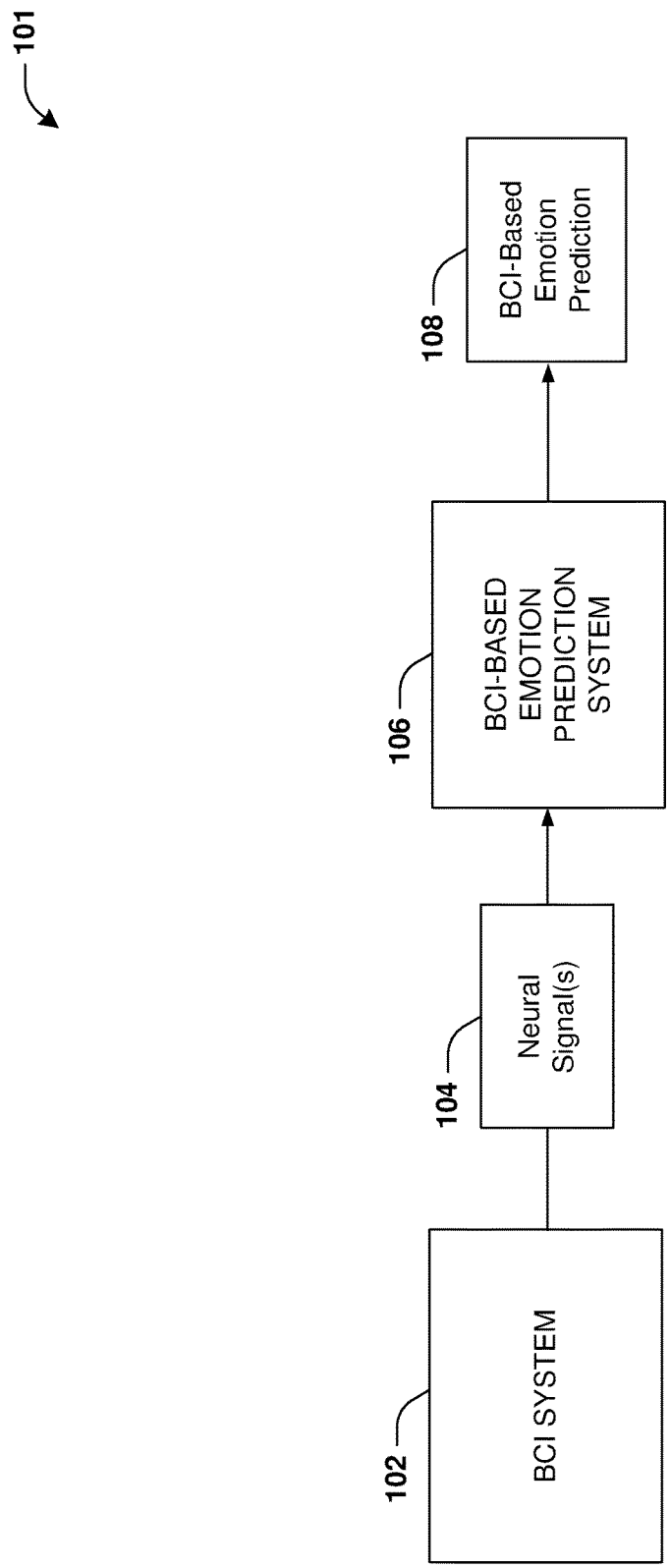
FIG. 1A is a diagram illustrating an example system for determining emotion predictions and/or confidence scores, where a brain-computer interface-based (BCI-based) emotion prediction is determined according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for determining emotion predictions and/or confidence scores are provided. In an example, one or more neural signals collected via a brain-computer interface (BCI) (which may also be referred to as brain-machine interface (BMI)) may be used to determine a first emotion prediction associated with a person. A facial expression of the person may be used to determine a second emotion prediction associated with the person. The first emotion prediction and the second emotion prediction may be used (e.g., combined with each other) to determine an enhanced emotion prediction associated with the person. For example, the enhanced emotion prediction may be determined based upon valence metrics and/or arousal metrics of the first emotion prediction and the second emotion prediction. The valence metrics may be combined (e.g., averaged) to determine a valence metric of the enhanced emotion prediction. The arousal metrics may be combined (e.g., averaged) to determine an arousal metric of the enhanced emotion prediction.

Using the techniques provided herein to determine the enhanced emotion prediction based upon the first emotion prediction and the second emotion prediction may provide for increased accuracy of the enhanced emotion prediction. For example, in cases in which the person hides their genuine emotion by displaying a fake emotional facial expression (e.g., the person shows a smile under stress and/or disagreements), the enhanced emotion prediction may still be an accurate representation of the person's emotion since the one or more neural signals, which may not be affected by the fake emotional facial expression, are accounted for in determining the enhanced emotion prediction. Alternatively and/or additionally, in cases in which the one or more neural signals have inaccuracies (e.g., due to inaccuracies and/or variability of equipment used to collect the one or more neural signals and/or the equipment being improperly used), the enhanced emotion prediction may still be an accurate representation of the person's emotion since the facial expression of the person is accounted for in determining the enhanced emotion prediction.

A confidence score of the enhanced emotion prediction may be determined based upon the first emotion prediction and the second emotion prediction. In an example, the first emotion prediction and the second emotion prediction may be mapped to positions in an emotion model, and the positions may be compared with each other to determine the confidence score. The emotion model may correspond to a circumplex model, and/or may have dimensions corresponding to at least one of arousal, valence, etc.

Services, such as websites, applications, etc. may provide platforms including social media platforms, communication platforms, etc. that facilitate interactions between users. In some platforms, users may interact with each other in a virtual environment where it may be difficult for one user to sense an emotional response of another user. Using the techniques provided herein, an avatar that represents a user in a virtual environment (e.g., a video game, social media, metaverse, etc.) may be rendered based upon an enhanced emotion prediction associated with the user and/or a confidence score of the enhanced emotion prediction. For example, the avatar may be rendered (e.g., in real time) to have an avatar facial expression that is reflective of the enhanced emotion prediction (e.g., the avatar may be rendered having a smiling facial expression to reflect happiness of the user). In this way, users may more conveniently and/or accurately gauge each other's emotional responses in the virtual environment.

FIGS. 1A-1E illustrate examples of a system 101 for determining emotion predictions and/or confidence scores. An emotion prediction system is provided that uses one or more neural signals associated with a first person and a facial expression of the first person to determine an emotion prediction associated with the first person.

FIG. 1A illustrates determination of a BCI-based emotion prediction 108 associated with the first person based upon one or more neural signals 104. The one or more neural signals 104 may be collected via a BCI established by a BCI system 102. The BCI system 102 may comprise one or more electrodes placed at one or more positions of the first person's body (e.g., at least one of the first person's face, the first person's head, the first person's scalp, intravenously, etc.) and/or one or more bioamplifiers to generate the one or more neural signals 104 (based upon one or more voltage fluctuations at the one or more electrodes, for example). The one or more neural signals 104 may comprise one or more electroencephalography (EEG) signals, one or more magnetoencephalography (MEG) signals, one or more electrooculography (EOG) signals, and/or one or more other types of neural signals. A BCI-based emotion prediction system 106 (of the emotion prediction system, for example) may receive the one or more neural signals 104 from the BCI system 102 and/or determine the BCI-based emotion prediction 108 based upon the one or more neural signals 104.

The BCI-based emotion prediction system 106 may determine a first arousal metric (e.g., a measure of arousal of the first person) and/or a first valence metric (e.g., a measure of valence of the first person) based upon the one or more neural signals 104. The BCI-based emotion prediction 108 may be indicative of the first arousal metric and/or the first valence metric. Alternatively and/or additionally, the BCI-based emotion prediction 108 may be indicative of an emotion (e.g., happy, pleased, angry, afraid, etc.) determined based upon the first arousal metric and/or the first valence metric. For example, the first arousal metric and/or the first valence metric may be mapped to the emotion using an emotion model 130 (e.g., a circumplex model), examples of which are shown in FIGS. 1D-1E. Alternatively and/or additionally, the first arousal metric and the first valence metric may be combined (e.g., linearly combined) to determine the emotion.

Figure 1B:
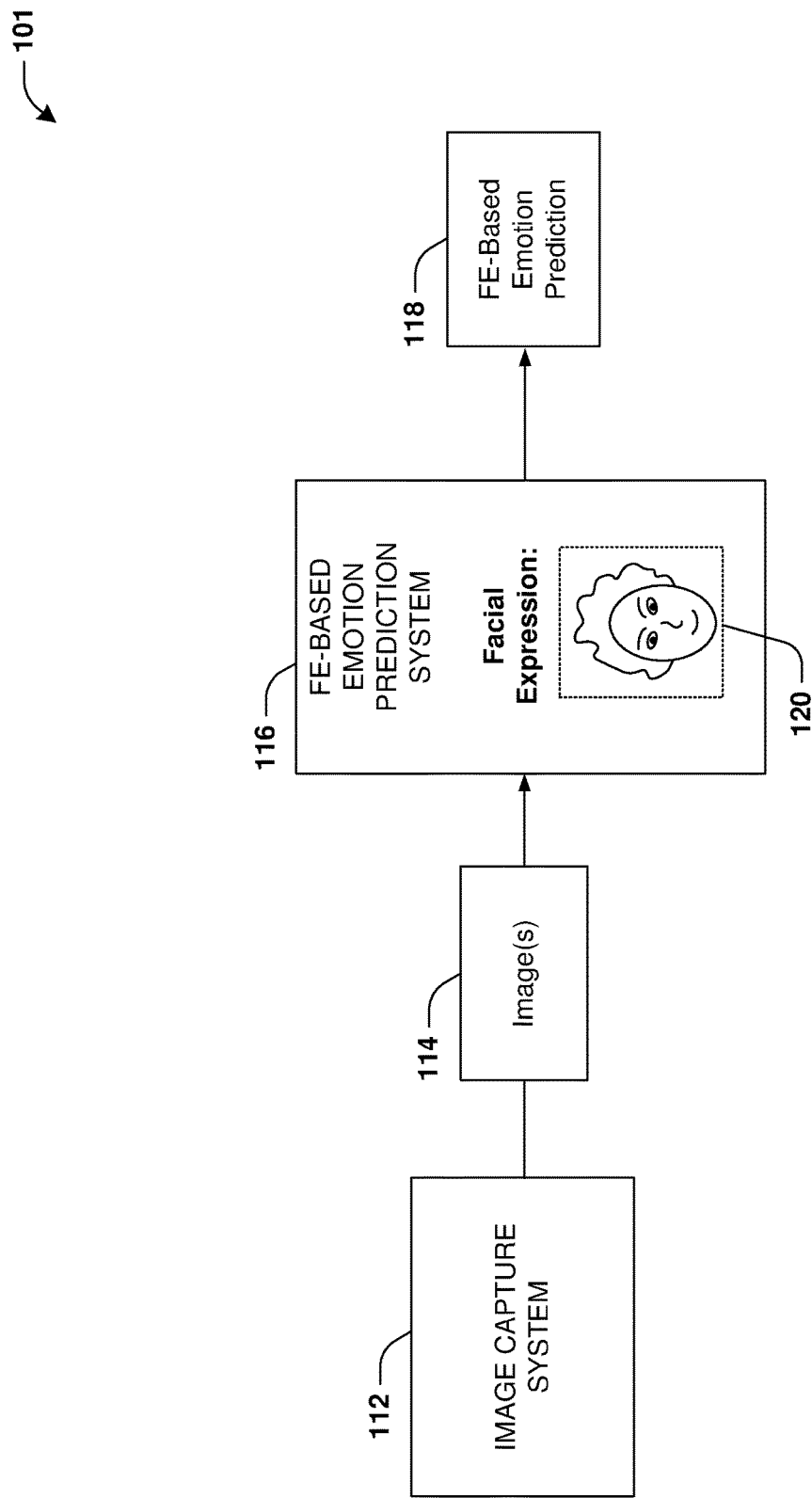
FIG. 1B is a diagram illustrating an example system for determining emotion predictions and/or confidence scores, where a facial expression-based (FE-based) emotion prediction is determined according to some embodiments.

FIG. 1B illustrates determination of a facial expression-based (FE-based) emotion prediction 118 associated with the first person based upon one or more images 114. The one or more images 114 may comprise a view of the first person's face, and may be collected via an image capture system 112 (e.g., a video capture system). For example, the image capture system 112 may comprise a camera configured to capture the one or more images 114. The camera may be connected to (and/or embedded in) a client device of the first person (e.g., the client device may comprise a smartphone, a tablet, a laptop, a wearable device mountable in a headset, an eyeglass, a wristwatch, etc.). Alternatively and/or additionally, the camera may be a standalone camera (e.g., the camera may be a security camera and/or a different type of camera, such as a webcam and/or an external camera, that may or may not be mounted on the client device of the first person). In an example, the one or more images 114 are video frames of a video captured using the camera. In an example, the video may correspond to a video communication session (e.g., a video call and/or a video conference call in which the first person converses with one or more other persons).

A facial expression 120 of the first person may be determined using the one or more images 114 (e.g., the video). In some examples, an FE-based emotion prediction system 116 (of the emotion prediction system, for example) may receive the one or more images 114 from the image capture system 112 and/or analyze (using computer vision, for example) the one or more images 114 to identify and/or extract the facial expression 120 in the one or more images 114. The facial expression 120 may comprise one or more facial actions (e.g., facial actions associated with autonomic activation and/or facial innervation of the first person), which may be determined (using computer vision, for example) by applying Facial Action Coding System (FACS) to the one or more images 114. Possible facial actions (e.g., action units (AUS)) of the facial actions may include "inner brow raiser", "outer brow raiser", "brow lowerer", etc. The FE-based emotion prediction 118 may be determined based upon the one or more facial actions identified in the one or more images 114 of the first person. In a first example, the FE-based emotion prediction 118 may be indicative of "happiness" based upon a determination that the one or more facial actions comprise a "cheek raiser" facial action and/or a "lip corner puller" facial action. In a second example, the FE-based emotion prediction 118 may be indicative of "sadness" based upon a determination that the one or more facial actions comprise an "inner brow raiser" facial action, a "brow lowerer" facial action, and/or a "lip corner depressor" facial action.

The FE-based emotion prediction system 116 may determine a second arousal metric (e.g., a measure of arousal of the first person) and/or a second valence metric (e.g., a measure of valence of the first person). The FE-based emotion prediction 118 may determine the second arousal metric and/or the second valence metric based upon an emotion (e.g., happy, pleased, angry, afraid, etc.) determined using the facial expression 120 (e.g., the one or more facial actions). In some examples, the FE-based emotion prediction 118 may be indicative of the emotion, the second arousal metric and/or the second valence metric. In an example, the emotion may be mapped to the second arousal metric and/or the second valence metric using the emotion model 130. Embodiments are contemplated in which (i) the FE-based emotion prediction system 116 determines the second arousal metric and/or the second valence metric based upon the facial expression 120, and/or (ii) the second arousal metric and/or the second valence metric are used (e.g., combined, such as linearly combined) to determine the emotion indicated by the FE-based emotion prediction 118.

Figure 1C:
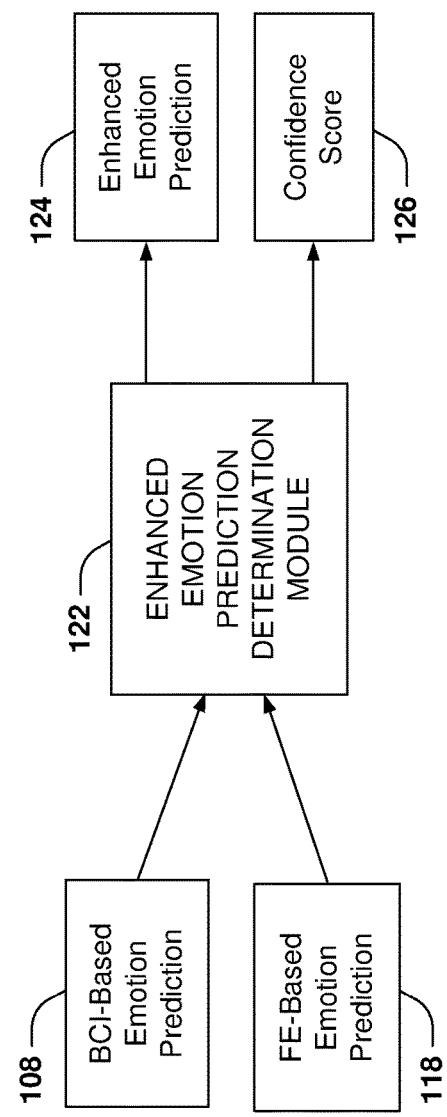
FIG. 1C is a diagram illustrating an example system for determining emotion predictions and/or confidence scores, where an enhanced emotion prediction and/or a confidence score are determined according to some embodiments.
Figure 1D:
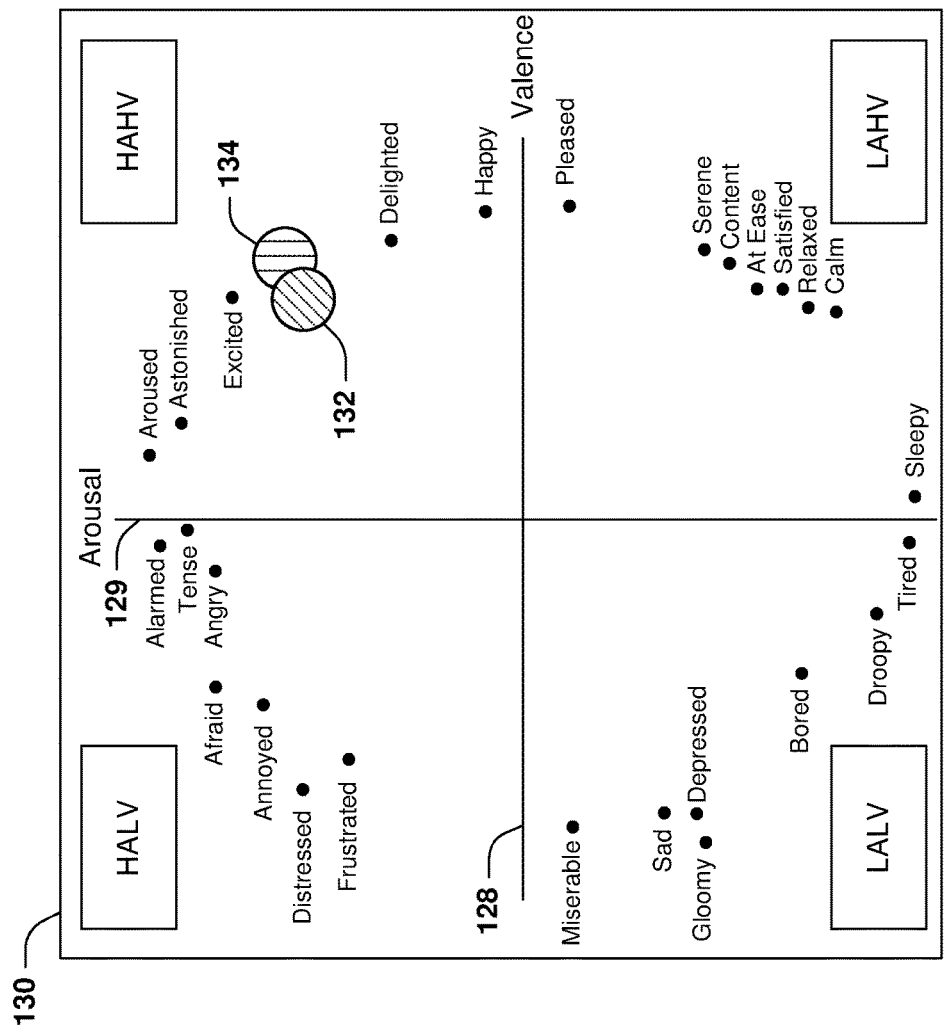
FIG. 1D illustrates an emotion model in which a first representation of a BCI-based emotion prediction and a second representation of a FE-based emotion prediction overlap according to some embodiments.
Figure 1E:
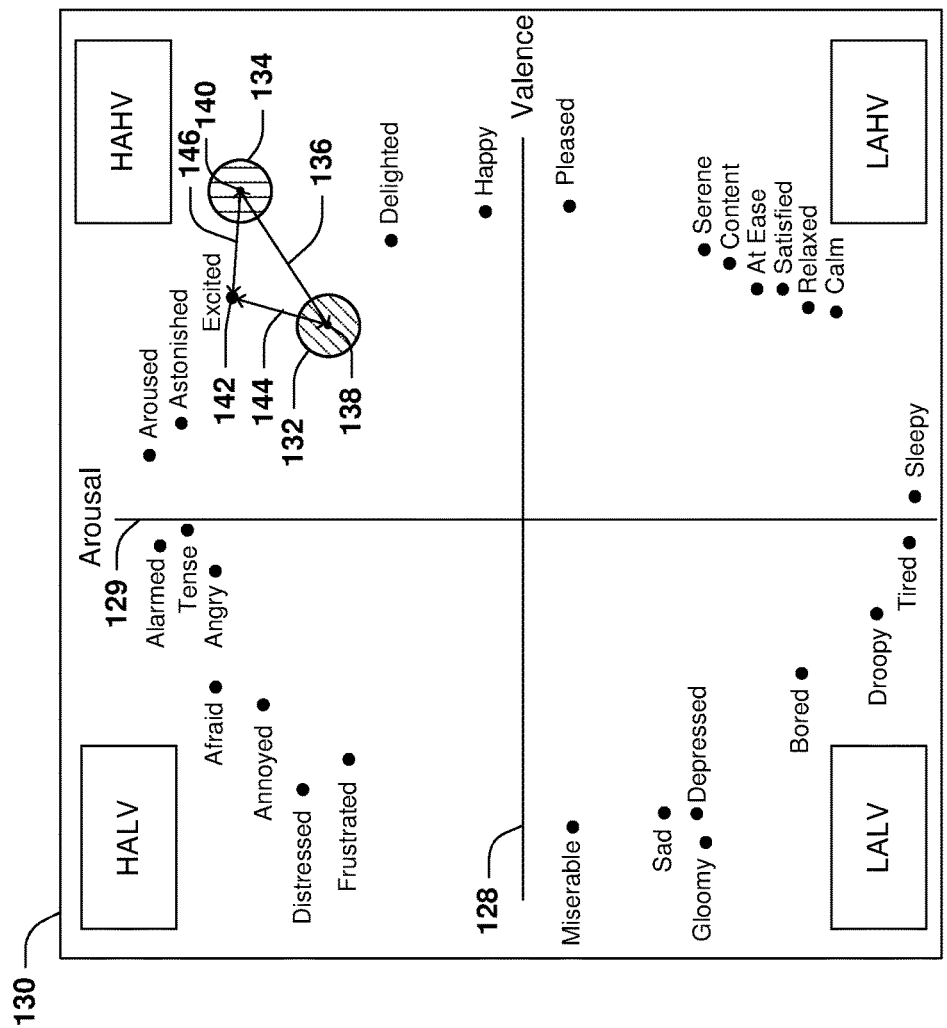
FIG. 1E illustrates an emotion model in which a first representation of a BCI-based emotion prediction and a second representation of a FE-based emotion prediction do not overlap according to some embodiments.

FIG. 1C illustrates determination of an enhanced emotion prediction 124 and/or a confidence score 126 of the enhanced emotion prediction 124 based upon the BCI-based emotion prediction 108 and the FE-based emotion prediction 118. In some examples, the BCI-based emotion prediction 108 and the FE-based emotion prediction 118 may be combined, using an enhanced emotion prediction determination module 122 (of the emotion prediction system, for example), to determine the enhanced emotion prediction 124. For example, one or more operations (e.g., mathematical operations) may be performed using the BCI-based emotion prediction 108 and the FE-based emotion prediction 118 to determine the enhanced emotion prediction 124.

In some examples, the enhanced emotion prediction 124 may be determined based upon a first weight applied to the BCI-based emotion prediction 108 and a second weight applied to the FE-based emotion prediction 118. The first weight may be higher than the second weight such that the BCI-based emotion prediction 108 has more influence and/or importance than the FE-based emotion prediction 118 in determining the enhanced emotion prediction 124. It may be appreciated that setting the second weight (associated with the BCI-based emotion prediction 108) to a value higher than the first weight (associated with the FE-based emotion prediction 118) may result in a higher accuracy of the enhanced emotion prediction 124 (e.g., since the BCI-based emotion prediction 108 may be more accurate than the FE-based emotion prediction 118 when the facial expression 120 used to determine the FE-based emotion prediction 118 is not an authentic reflection of the first person's actual emotion).

In an example, the enhanced emotion prediction 124 may be determined based upon the first arousal metric, the first valence metric, the second arousal metric and/or the second valence metric. For example, the first arousal metric (associated with the BCI-based emotion prediction 108) and/or the second arousal metric (associated with the FE-based emotion prediction 118) may be combined (e.g., combined, such as averaged, according to the first weight and the second weight) to determine a third arousal metric of the enhanced emotion prediction 124. Alternatively and/or additionally, the first valence metric (associated with the BCI-based emotion prediction 108) and/or the second valence metric (associated with the FE-based emotion prediction 118) may be combined (e.g., combined, such as averaged, according to the first weight and the second weight) to determine a third valence metric of the enhanced emotion prediction 124. The enhanced emotion prediction 124 may be indicative of the third arousal metric and/or the third valence metric. Alternatively and/or additionally, the enhanced emotion prediction 124 may be indicative of an emotion (e.g., happy, pleased, angry, afraid, etc.) determined based upon the third arousal metric and/or the third valence metric. For example, the third arousal metric and/or the third valence metric may be mapped to the emotion using the emotion model 130. Alternatively and/or additionally, the third arousal metric and the third valence metric may be combined (e.g., linearly combined) to determine the emotion.

The confidence score 126 of the enhanced emotion prediction 124 may be determined based upon the BCI-based emotion prediction 108 and the FE-based emotion prediction 118. For example, the confidence score 126 may be determined based upon a comparison of the BCI-based emotion prediction 108 with the FE-based emotion prediction 118. The comparison may correspond to a comparison of a first position of the BCI-based emotion prediction 108 and a second position of the FE-based emotion prediction 118 in the emotion model 130. For example, representations of the BCI-based emotion prediction 108 and the FE-based emotion prediction 118 may be mapped to positions (e.g., the first position and the second position, respectively) of the emotion model 130 (e.g., the positions may be based upon respective valence metrics and/or arousal metrics associated with the BCI-based emotion prediction 108 and the FE-based emotion prediction 118). The emotion model 130 may be an n-dimensional model, where n may be 2, 3, or other value.

FIG. 1D illustrates an example of the emotion model 130 with overlap between a first representation 132 of the BCI-based emotion prediction 108 and a second representation 134 of the FE-based emotion prediction 118. The emotion model 130 may comprise a valence axis 128 (e.g., a valence dimension) and/or an arousal axis 129 (e.g., an arousal dimension). The valence axis 128 and the arousal axis 129 may divide the emotion model 130 into quadrants comprising a high arousal low valence (HALV) quadrant (e.g., reference emotions "afraid", "angry", "tense", etc. may be positioned in the HALV quadrant), a high arousal high valence (HAHV) quadrant (e.g., reference emotions "astonished", "delighted", "happy", etc. may be positioned in the HAHV quadrant), a low arousal low valence (LALV) quadrant (e.g., reference emotions "sad", "bored", "tired", etc. may be positioned in the LALV quadrant), and a low arousal high valence (LAHV) quadrant (e.g., reference emotions "pleased", "content", "calm", etc. may be positioned in the LAHV quadrant). In some examples, the emotion model 130 may be a predefined model. Alternatively and/or additionally, positions of reference emotions in the emotion model 130 (and/or arousal and/or valence metrics of the reference emotions) may be predefined. Alternatively and/or additionally, the emotion model 130 and/or the positions (and/or the arousal and/or valence metrics) of the reference emotions may be based upon equipment-specific data (e.g., standards and/or other information provided by one or more manufacturers of equipment used to determine the BCI-based emotion prediction 108 and/or the FE-based emotion prediction 118).

In some examples, a size (e.g., a radius, a diameter, an area, etc.) of the first representation 132 (of the BCI-based emotion prediction 108) may be based upon (e.g., may be a function of) (i) an accuracy of the BCI-based emotion prediction 108 and/or (ii) one or more performance metrics, such as precision, accuracy, etc., of the BCI system 102 and/or the BCI-based emotion prediction system 106. For example, a higher accuracy of the BCI-based emotion prediction 108 (and/or improved performance metrics of the BCI system 102 and/or the BCI-based emotion prediction system 106) may correspond to a smaller size of the first representation 132.

Alternatively and/or additionally, a size (e.g., a radius, a diameter, an area, etc.) of the second representation 134 (of the FE-based emotion prediction 118) may be based upon (e.g., may be a function of) (i) an accuracy of the FE-based emotion prediction 118 and/or (ii) one or more performance metrics, such as precision, accuracy, etc., of the FE-based emotion prediction system 116. For example, a higher accuracy of the FE-based emotion prediction 118 (and/or improved performance metrics of the FE-based emotion prediction system 116) may correspond to a smaller size of the second representation 134.

In some examples, the confidence score 126 of the enhanced emotion prediction 124 may be set to a value in a defined range (e.g., 0 to 100, 0 to 10, 0 to 1, etc.). In some examples, the confidence score 126 may be set to a first value based upon the first representation 132 of the BCI-based emotion prediction 108 and the second representation 134 of the FE-based emotion prediction 118 overlapping (e.g., at least partially overlapping) in the emotion model 130. For example, the first value may be an upper limit of the defined range (e.g., the first value may be 100 if the defined range is 0 to 100, 10 if the defined range is 0 to 10, or 1 if the defined range is 0 to 1). Alternatively and/or additionally, the first value may be different than the upper limit. In some examples, the first value may be closer to the upper limit than to a lower limit (e.g., 0) of the defined range. In some examples, the first value of the confidence score 126 (when the representation 132 and the second representation 134 overlap) may be higher than a value of the confidence score 126 when the first representation 132 and the second representation 134 do not overlap.

Alternatively and/or additionally, the confidence score 126 may be determined based upon an extent to which the first representation 132 and the second representation 134 overlap each other. For example, the confidence score 126 may be a function of a size of an overlapping space in which the first representation 132 and the second representation 134 overlap, wherein a larger size of the overlapping space may correspond to a higher value of the confidence score 126.

FIG. 1E illustrates an example of the emotion model 130 without overlap between the first representation 132 of the BCI-based emotion prediction 108 and the second representation 134 of the FE-based emotion prediction 118. In some examples, the confidence score 126 of the enhanced emotion prediction 124 may be determined based upon a distance 136 between the first position of the BCI-based emotion prediction 108 and the second position of the FE-based emotion prediction 118 (e.g., in response to a determination that the first representation 132 and the second representation 134 do not overlap). In some examples, the first position may correspond to a point 138 (e.g., a center-point and/or a centroid) of the first representation 132 and/or the second position may correspond to a point 140 (e.g., a center-point and/or a centroid) of the second representation 134.

In some examples, the distance 136 may be compared with a first distance threshold. The confidence score 126 may be set to a second value based upon a determination that the distance 136 is smaller than the first distance threshold. The confidence score 126 may be set to a third value based upon a determination that the distance 136 is larger than (or equal to) the first distance threshold. In some examples, the second value is larger than the third value (e.g., the second value corresponds to a higher confidence than the third value). Alternatively and/or additionally, the confidence score 126 may be a function (e.g., a linear function, a step function, etc.) of the distance 136, wherein a higher value of the distance 136 corresponds to a lower value of the confidence score 126.

Alternatively and/or additionally, the confidence score 126 of the enhanced emotion prediction 124 may be determined based upon a BCI-to-reference distance 144 between the first position (e.g., the point 138) of the BCI-based emotion prediction 108 and a reference position 142 corresponding to a reference emotion (e.g., "Excited") and/or a FE-to-reference distance 146 between the second position (e.g., the point 140) of the FE-based emotion prediction 118 and the reference position 142 corresponding to the reference emotion. In some examples, the reference emotion corresponds to an emotion indicated by the enhanced emotion prediction 124. The reference position 142 may be based upon the reference emotion, an arousal metric (e.g., the third arousal metric) associated with the reference emotion and/or a valence metric (e.g., the third valence metric) associated with the reference emotion. In some examples, the BCI-to-reference distance 144 and/or the FE-to-reference distance 146 may be used to determine the confidence score 126 in response to a determination that the first representation 132 and the second representation 134 do not overlap.

In some examples, the BCI-to-reference distance 144 may be compared with a second distance threshold and/or the FE-to-reference distance 146 may be compared with a third distance threshold. The second distance threshold may be the same as or different than the third distance threshold. The confidence score 126 may be determined based upon the comparison of the distance 136 with the first distance threshold, the comparison of the BCI-to-reference distance 144 with the second distance threshold and/or the comparison of the FE-to-reference distance 146 with the third distance threshold.

In some examples, if the distance 136 is smaller than the first distance threshold (and the first representation 132 and the second representation 134 do not overlap, for example), the confidence score 126 may be set as follows: (i) the confidence score 126 may be set to a fourth value if the BCI-to-reference distance 144 is smaller than the second distance threshold and the FE-to-reference distance 146 is smaller than the third distance threshold, (ii) the confidence score 126 may be set to a fifth value (e.g., smaller than the fourth value) if the BCI-to-reference distance 144 is smaller than the second distance threshold and the FE-to-reference distance 146 is larger than (or equal to) the third distance threshold, and/or (iii) the confidence score 126 may be set to a sixth value (e.g., smaller than the fifth value) if the BCI-to-reference distance 144 is larger than (or equal to) the second distance threshold. In an example in which the defined range ranges from 0 to 100, the fourth value may be 90, the fifth value may be 80 and/or the sixth value may be 70.

In some examples, if the distance 136 is larger than (or equal to) the first distance threshold (and the first representation 132 and the second representation 134 do not overlap, for example), the confidence score 126 may be set as follows: (i) the confidence score 126 may be set to a seventh value if the BCI-to-reference distance 144 is smaller than the second distance threshold and the FE-to-reference distance 146 is smaller than the third distance threshold, (ii) the confidence score 126 may be set to an eighth value (e.g., smaller than the seventh value) if the BCI-to-reference distance 144 is smaller than the second distance threshold and the FE-to-reference distance 146 is larger than (or equal to) the third distance threshold, and/or (iii) the confidence score 126 may be set to a ninth value (e.g., smaller than the eighth value) if the BCI-to-reference distance 144 is larger than (or equal to) the second distance threshold. In an example in which the defined range ranges from 0 to 100, the seventh value may be 60, the eighth value may be 50 and/or the ninth value may be 40.

In some examples, the confidence score 126 of the enhanced emotion prediction 124 may be determined based upon at least one of personal information associated with the first person, environmental information associated with an environment of the first person, etc. For example, the confidence score 126 (determined using one or more of the techniques provided herein with respect to FIGS. 1A-1E, for example) may be modified (e.g., adjusted and/or fine-tuned) based upon at least one of the personal information, the environmental information, etc.

Figure 2A:
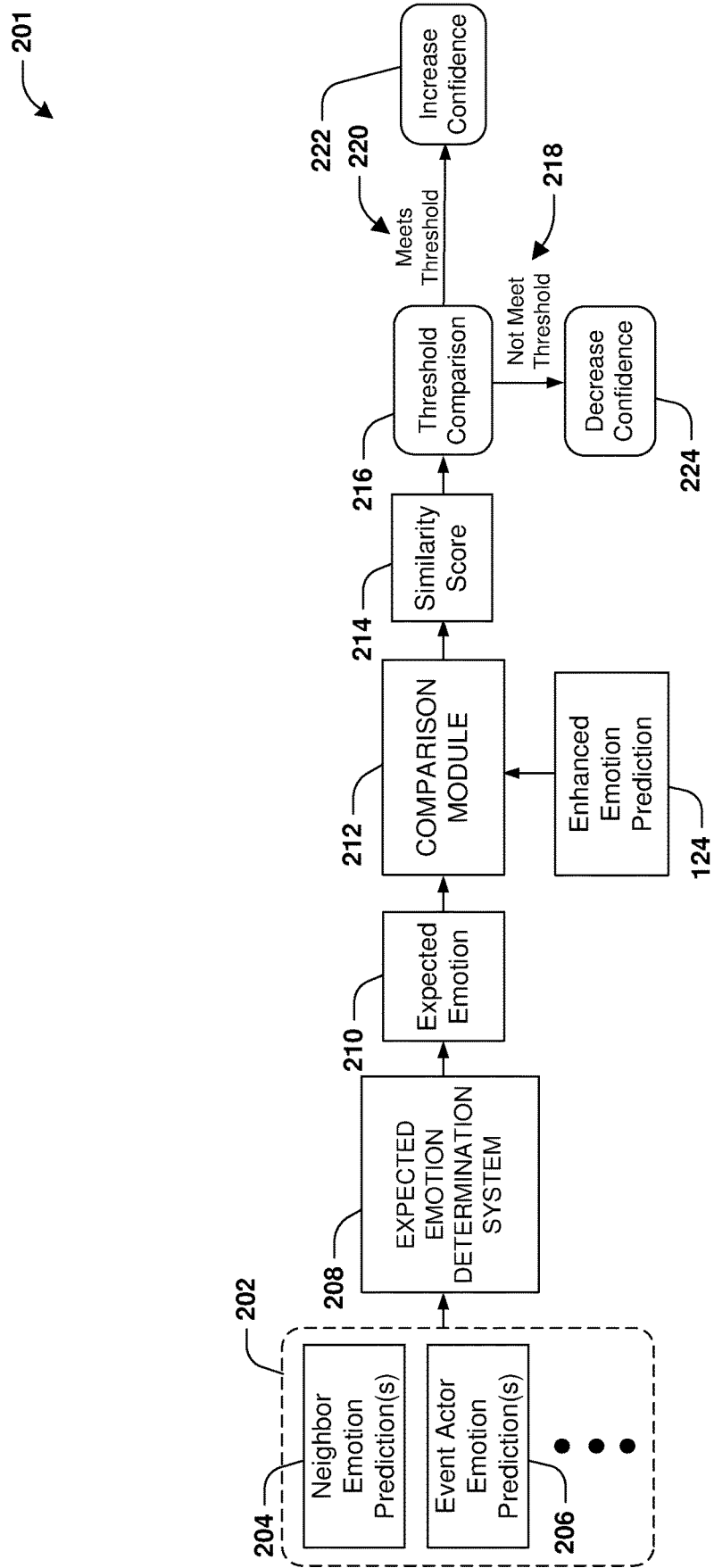
FIG. 2A is a diagram illustrating an example system for determining a confidence score of an enhanced emotion prediction, where an expected emotion is determined and used to modify a confidence score according to some embodiments.

FIGS. 2A-2E illustrate examples of a system 201 for determining (e.g., modifying) the confidence score 126 of the enhanced emotion prediction 124, and is further described in conjunction with the system 101 of FIGS. 1A-1E. FIG. 2A illustrates determination of an expected emotion 210 of the first person, and/or modification of the confidence score 126 based upon the expected emotion 210. The expected emotion 210 may be determined based upon information 202 comprising a set of (one or more) neighbor emotion predictions 204, a set of (one or more) event actor emotion predictions 206, and/or other information.

In some examples, the set of neighbor emotion predictions 204 may be associated with one or more neighboring persons neighboring the first person. For example, the one or more neighboring persons may be in an area in which the first person is located. A neighbor emotion prediction of the set of neighbor emotion predictions 204 may be indicative of an emotion of a neighboring person of the one or more neighboring persons. In an example, the neighbor emotion prediction may be determined using one or more of the techniques provided herein with respect to determining the enhanced emotion prediction 124, the BCI-based emotion prediction 108, and/or the FE-based emotion prediction 118.

In some examples, the set of event actor emotion predictions 206 may be associated with one or more event actors (e.g., a singer, a musician, a teacher, a sports player, a celebrity, a comedian, etc.) of an event (e.g., a concert, a class, a social event, a conference, a sports event, a show, etc.) in which the first person is a participant. In a first example, the event may be a class in which the first person is a student, and an event actor of the one or more event actors may be a teacher teaching the class. In a second example, the event may be a comedy show, and an event actor of the one or more event actors may be a stand-up comedian performing in the comedy show. The one or more neighboring persons may (also) be participants of the event, such as members of an audience. An event actor emotion prediction of the set of event actor emotion predictions 206 may be indicative of an emotion of an event actor of the one or more event actors. In an example, the event actor emotion prediction may be determined using one or more of the techniques provided herein with respect to determining the enhanced emotion prediction 124, the BCI-based emotion prediction 108, and/or the FE-based emotion prediction 118.

In some examples, the event may be a live (e.g., in-person) event. For example, the first person and/or the one or more neighboring persons may participate in the event in-person. Alternatively and/or additionally, the event may be a virtual event (e.g., an event implemented via a virtual reality system, an augmented reality system, a mixed reality system, a virtual reality social platform, etc.) in which the first person and/or the one or more neighboring persons may participate in the event remotely (e.g., a user may participate in the event remotely using a client device such as a laptop, a phone, a wearable device, a virtual reality-capable client device, such as a virtual reality headset, etc.).

Figure 2B:
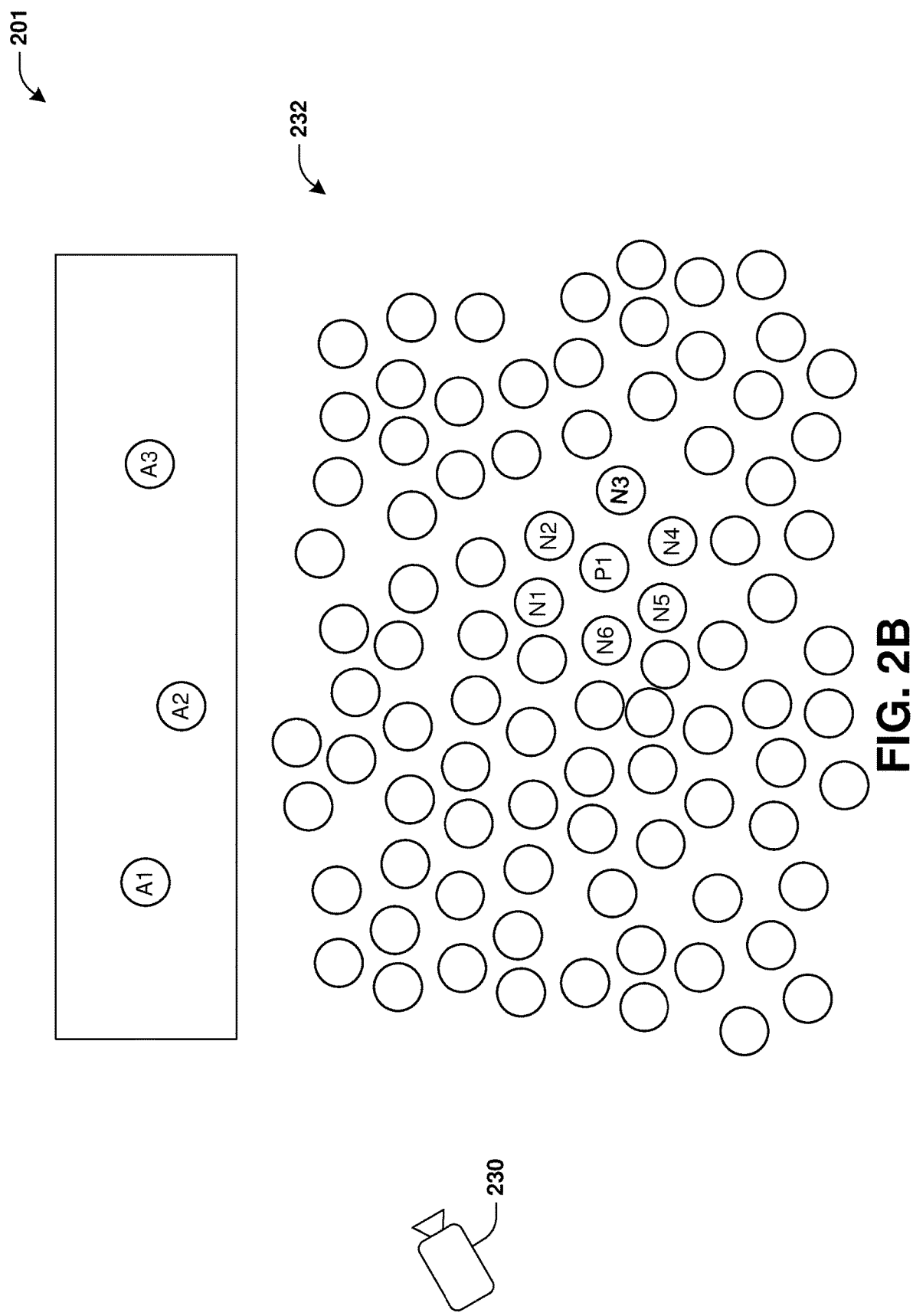
FIG. 2B is a diagram illustrating an example of an event with a plurality of participants and/or one or more event actors according to some embodiments.
Figure 2D:
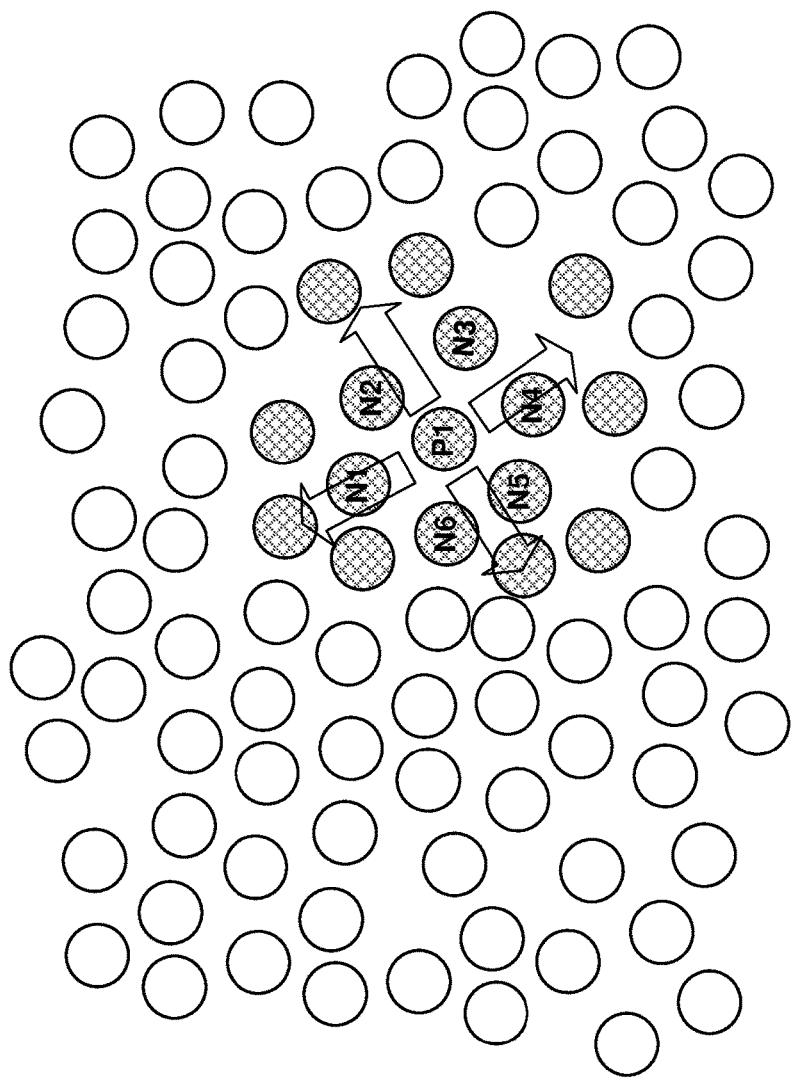
FIG. 2D is a diagram illustrating an example system for determining a confidence score of an enhanced emotion prediction, where a propagation of one or more threat emotions is identified according to some embodiments.
Figure 2D:
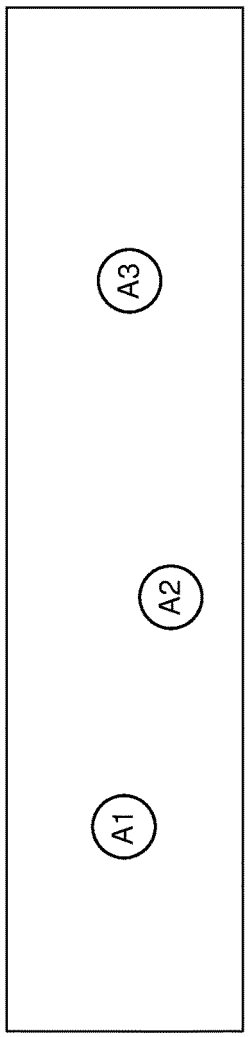
Figure 2D:
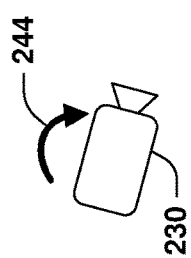

FIG. 2B illustrates an example of the event with a plurality of participants 232 and/or the one or more event actors comprising event actors A1, A2 and A3. In FIGS. 2B-2D, each participant of the plurality of participants 232 is shown as a circle. The plurality of participants 232 may include the one or more neighboring persons comprising neighboring persons N1, N2, N3, N4, N5 and/or N6. In some examples, the one or more neighboring persons may be identified (e.g., classified as neighboring persons of the first person) based upon a determination that the one or more neighboring persons are within a threshold distance of the first person (shown as "P1" in FIGS. 2B-2D). In FIG. 2B, the plurality of participants 232 may correspond to at least a part of an audience of the event, such as a show and/or presentation (e.g., a concert, a comedy show, a presentation at a conference, etc.) provided by the one or more event actors.

In some examples, the information 202 (e.g., the set of neighbor emotion predictions 204 and/or the set of event actor emotion predictions 206) may be input to an expected emotion determination system 208 (shown in FIG. 2A), which may determine the expected emotion 210 based upon the information 202. In an example, the set of neighbor emotion predictions 204 and/or the set of event actor emotion predictions 206 may be combined (e.g., averaged and/or otherwise combined in accordance with one or more first weights associated with the set of neighbor emotion predictions 204 and one or more second weights associated with the set of event actor emotion predictions 206) to determine the expected emotion 210. The emotion prediction system may comprise the expected emotion determination system 208.

Alternatively and/or additionally, the expected emotion 210 may be determined based upon merely the set of neighbor emotion predictions 204 (e.g., without using the set of event actor emotion predictions 206). For example, if the set of neighbor emotion predictions 204 comprises multiple neighbor emotion predictions, the multiple neighbor emotion predictions may be combined (e.g., averaged) to determine the expected emotion 210. Alternatively and/or additionally, if the set of neighbor emotion predictions 204 comprises merely a single neighbor emotion prediction, the expected emotion 210 may be based upon (e.g., may be the same as) the single neighbor emotion prediction.

Alternatively and/or additionally, the expected emotion 210 may be determined based upon merely the set of event actor emotion predictions 206 (e.g., without using the set of neighbor emotion predictions 204). For example, if the set of event actor emotion predictions 206 comprises multiple event actor emotion predictions, the multiple event actor emotion predictions may be combined (e.g., averaged) to determine the expected emotion 210. Alternatively and/or additionally, if the set of event actor emotion predictions 206 comprises merely a single event actor emotion prediction, the expected emotion 210 may be based upon (e.g., may be the same as) the single event actor emotion prediction.

The expected emotion 210 may be compared (using a comparison module 212, for example) with the enhanced emotion prediction 124 to determine a first similarity score 214, which may correspond to a similarity between the expected emotion 210 and the enhanced emotion prediction 124. In some examples, the first similarity score 214 may be determined based upon a second distance between a position of the expected emotion 210 and a position of the enhanced emotion prediction 124 in the emotion model 130 (shown in FIGS. 1D-1E). The second distance may be determined using one or more of the techniques provided herein with respect to determining the distance 136 (shown in FIG. 1E).

In an example, the first similarity score 214 may be a function of the second distance, wherein a lower value of the second distance may correspond to a higher value of the first similarity score 214 (e.g., a smaller value of the second distance may be indicative of a higher level of similarity of the expected emotion 210 to the enhanced emotion prediction 124).

The confidence score 126 may be modified based upon the first similarity score 214. In an example, the first similarity score 214 may be compared, at 216, with a first similarity threshold. In response to the first similarity score 214 meeting (e.g., equaling or exceeding) the first similarity threshold at 220, the confidence score 126 may be increased at 222. One or more other actions (in addition or as an alternative to increasing the confidence score 126) may be performed in response to the first similarity score 214 meeting the first similarity threshold at 220. In response to the first similarity score 214 not meeting (e.g., not exceeding) the first similarity threshold at 218, the confidence score 126 may be decreased at 224. One or more other actions (in addition or as an alternative to decreasing the confidence score 126) may be performed in response to the first similarity score 214 not meeting the first similarity threshold at 218. It may be appreciated that determining the expected emotion 210, and using the expected emotion 210 to modify (e.g., increase or decrease) the confidence score 126 may provide for increased accuracy of the confidence score 126.

In some examples, a plurality of emotion predictions associated with a plurality of persons may be determined. In an example, the plurality of persons may be in a first area in which the first person is located. The one or more neighboring persons may be in a second area within the first area. The one or more neighboring persons may be a subset of the plurality of persons. In some examples, the first area may be associated with the event, and/or the plurality of persons may comprise the plurality of participants 232 (shown in FIG. 2B). The plurality of emotion predictions may be determined using one or more of the techniques provided herein with respect to determining the enhanced emotion prediction 124, the BCI-based emotion prediction 108, and/or the FE-based emotion prediction 118.

In some examples, the plurality of emotion predictions may be monitored over time to detect emotion changes of persons of the plurality of persons (e.g., an emotion change may correspond to an emotion prediction of a person changing from a first emotion prediction, such as aroused, to a second emotion prediction, such as excited). Based upon the plurality of emotion predictions (e.g., based upon the detected emotion changes), a group propagation of emotion through at least some of the plurality of persons may be identified. The group propagation of emotion may correspond to a change in emotion that is propagated through persons of the plurality of persons. For example, the group propagation of emotion may be identified based upon detection of emotion changes in which persons of the plurality of persons switch to one or more propagated emotions. The one or more propagated emotions may comprise a single emotion or a set of related emotions. The set of related emotions may comprise emotions that are defined as being related to each other. Alternatively and/or additionally, the set of related emotions may correspond to emotions that are within a threshold distance of each other in the emotion model 130. In a first example, the set of related emotions may comprise "astonished", "excited", "delighted", and/or "happy". In a second example, the set of related emotions may comprise "angry", "alarmed", "tense" and/or "afraid".

FIG. 2C illustrates an example of the group propagation of emotion. In FIG. 2C, persons of the plurality of persons that are associated with an emotion of the one or more propagated emotions (e.g., persons that changed to the one or more propagated emotions in accordance with the group propagation of emotion) are shown as pattern-filled circles, whereas persons that are associated with an emotion different than the one or more propagated emotions are shown as non-pattern-filled circles. In an example, the group propagation of emotion may be associated with a propagation direction 238. The propagation direction 238 may correspond to a direction in which the one or more propagated emotions are propagated through persons of the plurality of persons. In FIG. 2C, the propagation direction 238 may be a direction from the one or more event actors (e.g., A1, A2 and/or A3) towards persons, of the plurality of participants 232, furthest from the one or more event actors. That is, persons closer to the one or more event actors may change emotion in accordance with the group propagation of emotion sooner than persons that are further from the one or more event actors. In an example, the group propagation of emotion may be originated by an occurrence, such as at least one of a statement by the one or more event actors, a performance (e.g., a joke, a song, etc.) of the one or more event actors, an incident in the audience (e.g., pushing, unusual behavior, an exciting incident, etc. associated with one or more members of the audience), etc. For example, a location of the occurrence may correspond to a point of origination the group propagation of emotion (e.g., in FIG. 2C, the point of origination may correspond to a stage where the one or more event actors are located, and/or the propagation direction 238 may point away from the point of origination).

In some examples, a propagation effect may be determined based upon whether the group propagation of emotion reached the first person. For example, the propagation effect may be indicative of whether the group propagation of emotion reached (and/or passed) the first person and/or whether the enhanced emotion prediction 124 corresponds to an emotion of the one or more propagated emotions. In some examples, it may be determined that the group propagation of emotion reached the first person based upon one or more first determinations comprising: (i) a determination that one or more persons, of the plurality of persons, that are further from the point of origination than the first person, are affected by the group propagation of emotion (e.g., the one or more persons undergo a change of emotion to an emotion of the one or more propagated emotions), and/or (ii) a determination that one, some and/or all of the one or more neighboring persons of the first person are affected by the group propagation of emotion (e.g., the one, some and/or all persons undergo a change of emotion to an emotion of the one or more propagated emotions). In some examples, even if the enhanced emotion prediction 124 does not correspond to an emotion of the one or more propagated emotions (e.g., even if the first person is not affected by the group propagation of emotion), the propagation effect may be indicative of the group propagation of emotion having reached (and/or passed) the first person based upon the one or more first determinations.

In some examples, the confidence score 126 may be modified based upon the propagation effect. The confidence score 126 may be increased (and/or one or more other actions may be performed) based upon the propagation effect indicating that (i) the group propagation of emotion reached (and/or passed) the first person, and/or (ii) the enhanced emotion prediction 124 corresponds to an emotion of the one or more propagated emotions. The confidence score 126 may be decreased (and/or one or more other actions may be performed) based upon the propagation effect indicating that (i) the group propagation of emotion reached (and/or passed) the first person, and/or (ii) the enhanced emotion prediction 124 does not correspond to an emotion of the one or more propagated emotions. In some examples, the confidence score 126 may not be modified based upon the propagation effect if it is determined that the group propagation of emotion did not reach the first person.

In some examples, the plurality of emotion predictions associated with the plurality of persons may be analyzed (e.g., monitored) to identify a propagation of one or more threat emotions by the first person to at least some persons of the plurality of persons. The propagation of the one or more threat emotions (e.g., "angry", "alarmed", "tense", "afraid", etc.) may be reflective of at least one of a potential danger to public safety, a threatening event, illegal activity, rioting, etc. at a point of origination (e.g., a location of the first person) of the propagation of the one or more threat emotions. FIG. 2D illustrates an example of the propagation of the one or more threat emotions. In FIG. 2D, persons of the plurality of persons that are associated with an emotion of the one or more threat emotions (e.g., persons that undergo a change of emotion to the one or more threat emotions in accordance with the propagation of the one or more threat emotions) are shown as pattern-filled circles, whereas persons that are associated with an emotion different than the one or more propagated emotions are shown as non-pattern-filled circles. The propagation of the one or more threat emotions may be identified based upon (i) the enhanced emotion prediction 124 being indicative of a threat emotion of the one or more threat emotions, and/or (ii) the one or more threat emotions being propagated from the first person to other persons (e.g., the one or more neighboring persons and/or one or more other persons of the plurality of persons).

In some examples, in response to identifying the propagation of the one or more threat emotions, one or more threat response actions may be performed (e.g., the one or more threat response actions may be performed automatically and/or without manual intervention in response to identifying the propagation of the one or more threat emotions). The one or more threat response actions may comprise adjusting (e.g., zooming out, zooming in, repositioning, etc.) a camera 230 (e.g., a security camera) to capture a view of the first person. For example, the camera 230 may be moved 244 to capture the view of the first person based upon the location of the first person (e.g., the location of the first person may correspond to the point of origination of the propagation of the one or more threat emotions). For example, the location of the first person may be determined based upon geolocation information received from the client device of the first person. Alternatively and/or additionally, the one or more threat response actions may comprise displaying the view captured by the camera 230 via a display of a monitoring device (e.g., the monitoring device may be used by a security agent and/or a law enforcement official to check for danger, threatening events, illegal activity, rioting, etc.). Alternatively and/or additionally, the one or more threat response actions may comprise transmitting one or more threat alerts to one or more devices (e.g., one or more client devices of one or more security agents and/or law enforcement). The one or more threat alerts may be indicative of (i) the location of the first person, and/or (ii) one or more images and/or video (captured by the camera 230, for example) comprising a view of the first person.

Figure 2E:
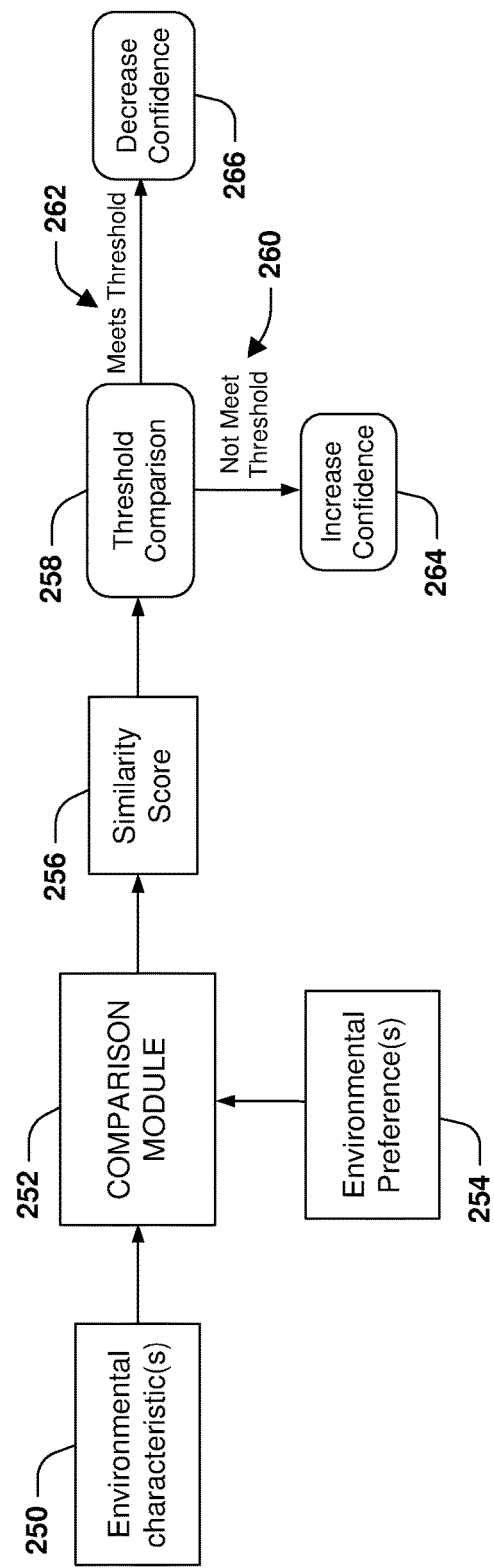
FIG. 2E is a diagram illustrating an example system for determining a confidence score of an enhanced emotion prediction, where a confidence score is modified based upon a set of environmental characteristics of an environment of a person and/or a set of environmental preferences of the person, according to some embodiments.

FIG. 2E illustrates modification of the confidence score 126 based upon (i) a set of environmental characteristics 250 of an environment of the first person and/or the event and/or (ii) a set of environmental preferences 254 of the first person. In some examples, the set of (one or more) environmental characteristics 250 may comprise (i) one or more weather conditions of the environment (e.g., a temperature, precipitation level, humidity level, rain, snow, etc.), (ii) one or more geographical characteristics of the environment (e.g., a landscape of a location of the first person and/or whether the location of the first person corresponds to a city, a village, a town, a rural area, a countryside, etc.), and/or (iii) one or more sensory characteristics of the environment (e.g., a noise level in the environment, a type of noise in the environment, a type of smell in the environment, etc.). The set of environmental characteristics 250 may be determined based upon the location of the first person, the event (e.g., a type of event of the event, such as a concert, a class, etc.), and/or other information.

In some examples, the set of (one or more) environmental preferences 254 may comprise one or more environmental characteristics for which the first person has a preference. The set of environmental preferences 254 may be determined based upon (i) one or more user-input preferences input by the first person via an interface, and/or (ii) one or more personal events associated with the first person. The one or more personal events may comprise activities performed by the first person, events attended by the first person, locations visited by the first person, and/or other events. In an example, an environmental preference of "loud music" may be included in the set of environmental preferences 254 based upon a determination that the one or more personal events comprise one or more events in which the first person attended music concerts. In an example, an environmental preference of "rural area" may be included in the set of environmental preferences 254 based upon a determination that the one or more personal events comprise one or more events in which the first person visits locations classified as rural areas.

The set of environmental characteristics 250 (of the environment) may be compared (using a comparison module 252, for example) with the set of environmental preferences 254 (of the first person) to determine a second similarity score 256, which may correspond to a similarity between the set of environmental characteristics 250 and the set of environmental preferences 254. In some examples, the second similarity score 256 may be determined based upon a quantity of environmental characteristics that are in both the set of environmental characteristics 250 (of the environment) and the set of environmental preferences 254 (of the first person). For example, the second similarity score 256 may be a function of the quantity of environmental characteristics, wherein a larger quantity of environmental characteristics may correspond to a higher value of the second similarity score 256.

It may be appreciated that when the enhanced emotion prediction 124 for the first person is different than the expected emotion 210 for the first person, the context surrounding that difference, such as the second similarity score 256 corresponding to the environment and the first person, can impact a level of confidence in the enhanced emotion prediction 124. For example, if the difference is justified by the context (e.g., the first person has preferences that conflict with the environment), then the enhanced emotion prediction 124 may be considered to be understandable, and may thus be associated with a higher level of confidence. If instead, the difference is found to be unexpected even in view of the context (e.g., the first person has preferences consistent with the environment), then the enhanced emotion prediction 124 may not be considered to be understandable, and may thus be associated with a lower level of confidence.

Accordingly, in some examples (e.g., in which the enhanced emotion prediction 124 for the first person is different than the expected emotion 210 for the first person), the confidence score 126 may be modified based upon the second similarity score 256. The second similarity score 256 may be compared, at 258, with a second similarity threshold. The second similarity score 256 may be set to a value in a range of 0% to 100%, and the second similarity threshold may be 75% (or other value), for example. In response to the second similarity score 256 meeting (e.g., equaling or exceeding) the second similarity threshold at 262, the confidence score 126 may be decreased at 266. An amount by which the confidence score 126 is decreased at 266 may be a function of the second similarity score 256 (e.g., a higher value of the second similarity score 256 may correspond to a larger decrease of the confidence score 126). One or more other actions (in addition or as an alternative to decreasing the confidence score 126) may be performed in response to the second similarity score 256 meeting the second similarity threshold at 262. In response to the second similarity score 256 not meeting (e.g., not exceeding) the second similarity threshold at 260, the confidence score 126 may be increased at 264. An amount by which the confidence score 126 is increased at 264 may be a function of the second similarity score 256 (e.g., a lower value of the second similarity score 256 may correspond to greater increase to the confidence score 126). One or more other actions (in addition or as an alternative to increasing the confidence score 126) may be performed in response to the second similarity score 256 not meeting the second similarity threshold at 260. It may be appreciated that determining the second similarity score 256 associated with the set of environmental characteristics 250 and/or the set of environmental preferences 254, and/or using the second similarity score 256 to modify the confidence score 126 may provide for increased accuracy of the confidence score 126.

In some examples, the set of environmental characteristics 250, the set of environmental preferences 254 and/or the second similarity score 256 may be determined (and/or may be used to modify the confidence score 126) in response to a determination that (i) the group propagation of emotion (discussed with respect to FIG. 2C, for example) reached (and/or passed) the first person, (ii) the enhanced emotion prediction 124 corresponds to an emotion different than the one or more propagated emotions, and/or (iii) the first similarity score 214 (corresponding to the similarity between the expected emotion 210 and the enhanced emotion prediction 124) does not meet (e.g., does not exceed) the first similarity threshold.

In an example scenario, the event may be a music concert (e.g., the first person may be a participant of the music concert). It may be determined that the group propagation of emotion (discussed with respect to FIG. 2C, for example) has reached (and/or passed) the first person, but that the enhanced emotion prediction 124 associated with the first person does not correspond to a propagated emotion of the one or more propagated emotions. For example, the one or more propagated emotions may comprise "excited", "delighted", and/or "happy", whereas the enhanced emotion prediction 124 may correspond to "tense". The first similarity score 214 may not meet the first similarity threshold due to the expected emotion 210 being associated with "excited", "delighted", and/or "happy" and/or the enhanced emotion prediction 124 corresponding to "tense".

In the example scenario, the second similarity score 256 not meeting the second similarity threshold may be reflective of the first person's preferences not matching environmental characteristics of the event, and may be reflective of a reason (e.g., a basis and/or cause) for the enhanced emotion prediction 124 (i) being different than the expected emotion 210 and/or (ii) not corresponding to a propagated emotion of the one or more propagated emotions (e.g., the reason the first person may be "tense" is that the first person does not have a preference for loud music, unlike other participants of the music concert who may be "excited" because they do have a preference for loud music). Accordingly, the second similarity score 256 not meeting the second similarity threshold may provide a possible justification and/or explanation for the first person not having the expected emotion 210 and/or the one or more propagated emotions. Thus, the confidence score 126 may be increased in response to the second similarity score 256 not meeting the second similarity threshold. However, scenarios in which the second similarity score 256 meets the second similarity threshold may not provide a possible justification and/or explanation for the first person not having the expected emotion 210 and/or the one or more propagated emotions. Thus, in response to the second similarity score 256 meeting the second similarity threshold (e.g., the first person's preferences matching environmental characteristics of the event), the confidence score 126 may be decreased.

Figure 3:
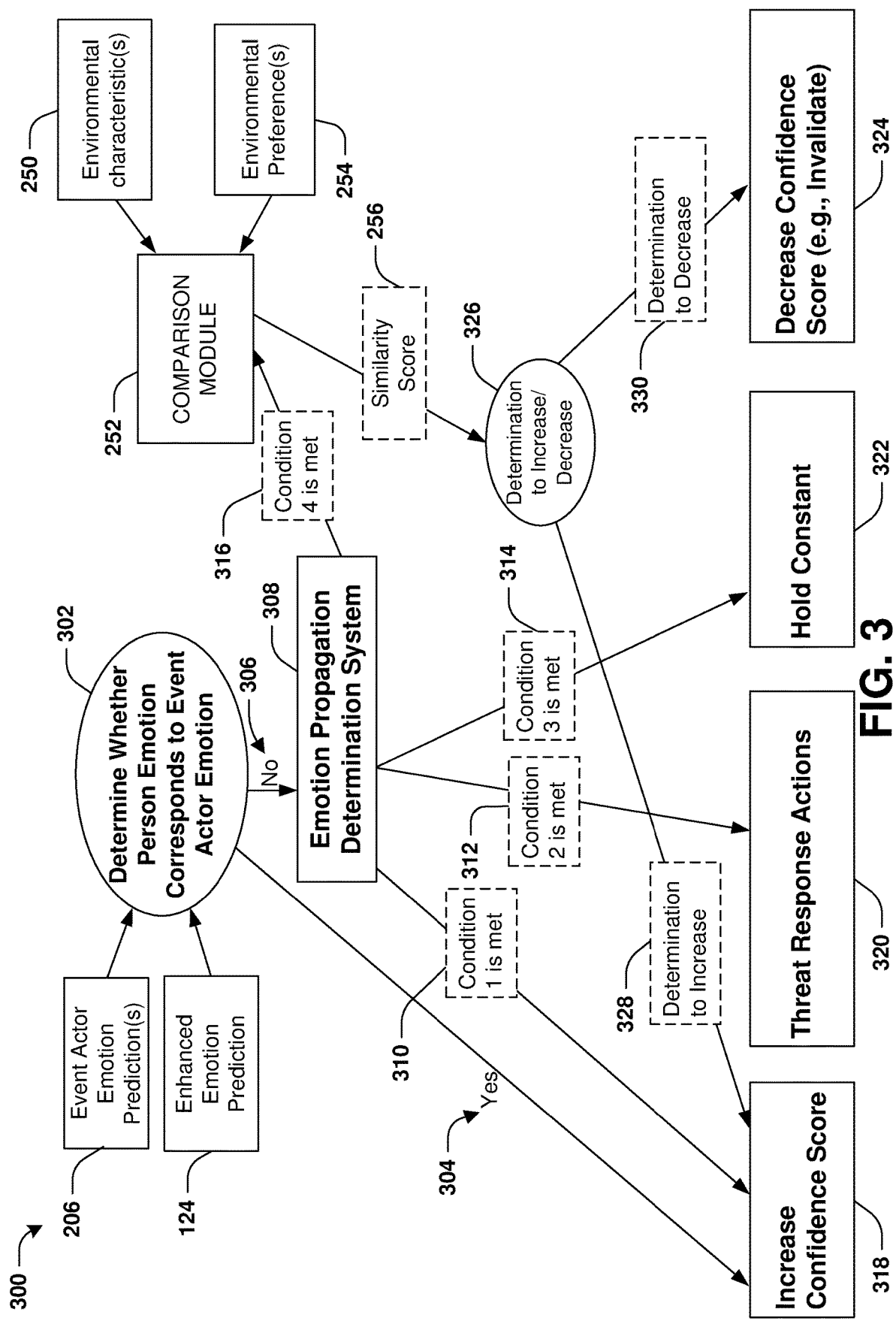
FIG. 3 is a flow chart illustrating an example method for determining a confidence score of an enhanced emotion prediction in accordance with an embodiment.

An embodiment of determining (e.g., modifying) the confidence score 126 of the enhanced emotion prediction 124 is illustrated by an exemplary method 300 of FIG. 3, and is further described in conjunction with the system 101 of FIGS. 1A-1E and/or the system 201 of FIGS. 2A-2E. The exemplary method 300 may be performed using one or more of the techniques provided herein, such as those shown in and/or described with respect to FIGS. 1A-1E and/or FIGS. 2A-2E. In some examples, after determining the confidence score 126 using one or more of the techniques shown in and/or discussed with respect to FIGS. 1C-1E, the confidence score 126 may be modified by performing the exemplary method 300. It may be appreciated that modifying (e.g., adjusting) the confidence score 126 using one or more of the techniques of the exemplary method 300 may increase an accuracy of the confidence score 126.

At 302, the emotion prediction system may determine whether the enhanced emotion prediction 124 associated with the first person corresponds to (e.g., matches) the set of event actor emotion predictions 206. The emotion prediction system may determine whether the enhanced emotion prediction 124 corresponds to the set of event actor emotion predictions 206 by (i) determining an expected emotion based upon the set of event actor emotion predictions 206, (ii) determining a similarity score corresponding to a similarity between the enhanced emotion prediction 124 and the expected emotion, and/or (iii) determining whether the similarity score meets the first similarity threshold. If the emotion prediction system determines, at 304, that the enhanced emotion prediction 124 corresponds to the set of event actor emotion predictions 206 (e.g., if the similarity score is determined to meet the first similarity threshold), the emotion prediction system may increase the confidence score 126 at 318. If the emotion prediction system determines, at 306, that the enhanced emotion prediction 124 does not correspond to the set of event actor emotion predictions 206 (e.g., if the similarity score is determined not to meet the first similarity threshold), an emotion propagation determination system 308 (of the emotion prediction system, for example) may be used to determine whether one or more conditions (e.g., Condition 1, Condition 2, Condition 3 and/or Condition 4 discussed below) are met.

The emotion propagation determination system 308 may determine whether the one or more conditions are met by determining (i) whether the enhanced emotion prediction 124 corresponds to the set of neighbor emotion predictions 204, and/or (ii) whether the group propagation of emotion (discussed with respect to FIG. 2C, for example) has reached (and/or passed) the first person. The emotion propagation determination system 308 may determine whether the enhanced emotion prediction 124 corresponds to the set of neighbor emotion predictions 204 using one or more of the techniques provided herein with respect to determining, at 302, whether the enhanced emotion prediction 124 corresponds to the set of event actor emotion predictions 206.

Condition 1 may be a condition that (i) the enhanced emotion prediction 124 corresponds to the set of neighbor emotion predictions 204, and (ii) the group propagation of emotion has reached the first person. If Condition 1 is determined, at 310, to be met, the confidence score 126 may be increased at 318.

Condition 2 may be a condition that the propagation of the one or more threat emotions by the first person is identified (e.g., the enhanced emotion prediction 124 is indicative of a threat emotion of the one or more threat emotions, and/or the one or more threat emotions are propagated from the first person to one or more other persons). If Condition 2 is determined, at 312, to be met, the one or more threat response actions may be performed at 320.

Condition 3 may be a condition that the group propagation of emotion has not reached the first person (regardless of whether the enhanced emotion prediction 124 corresponds to the set of neighbor emotion predictions 204, for example). If Condition 3 is determined, at 314, to be met, the confidence score 126 may be held constant at 322 (e.g., the emotion propagation determination system 308 may wait until the group propagation of emotion reaches the first person to determine whether Condition 1, Condition 2 and/or Condition 4 are met).

Condition 4 may be a condition that (i) the enhanced emotion prediction 124 does not correspond to the set of neighbor emotion predictions 204, and (ii) the group propagation of emotion reached the first person. If Condition 4 is determined, at 316, to be met, the comparison module 252 may be used to determine the second similarity score 256 corresponding to the similarity between the set of environmental characteristics 250 and the set of environmental preferences 254.

At 326, the emotion prediction system may determine whether to increase or decrease the confidence score 126 based upon the second similarity score 256. In some examples, the emotion prediction system may determine, at 328, to increase the confidence score 126 at 318 based upon a determination that the second similarity score 256 does not meet the second similarity threshold. Alternatively and/or additionally, the emotion prediction system may determine, at 328, to increase the confidence score 126 at 318 based upon a determination that one or more events associated with the first person occurred (e.g., in the recent past, such as during the last 24 hours) that potentially caused the first person to have an emotion that is different than the set of event actor emotion predictions 206 and/or the set of neighbor emotion predictions 204 (e.g., the first person has an unexpected emotion because of the one or more events).

In some examples, the emotion prediction system may determine, at 330, to decrease the confidence score 126 at 324 based upon a determination that (i) the second similarity score 256 meets the second similarity threshold, and/or (ii) an event that potentially caused the first person to have an emotion that is different than the set of event actor emotion predictions 206 and/or the set of neighbor emotion predictions 204 is not detected. In some examples, decreasing the confidence score 126 at 324 may comprise invalidating the enhanced emotion prediction 124. For example, the confidence score 126 may be invalidated by (i) setting (e.g., decreasing) the confidence score 126 to the lower limit (e.g., 0) of the defined range, and/or (ii) setting (e.g., decreasing) the confidence score 126 to a value that is lower than a threshold confidence (e.g., emotion predictions associated with confidence scores higher than the threshold confidence may be valid, whereas emotion predictions associated with confidence scores higher than the threshold confidence may be invalid).

Figure 4:
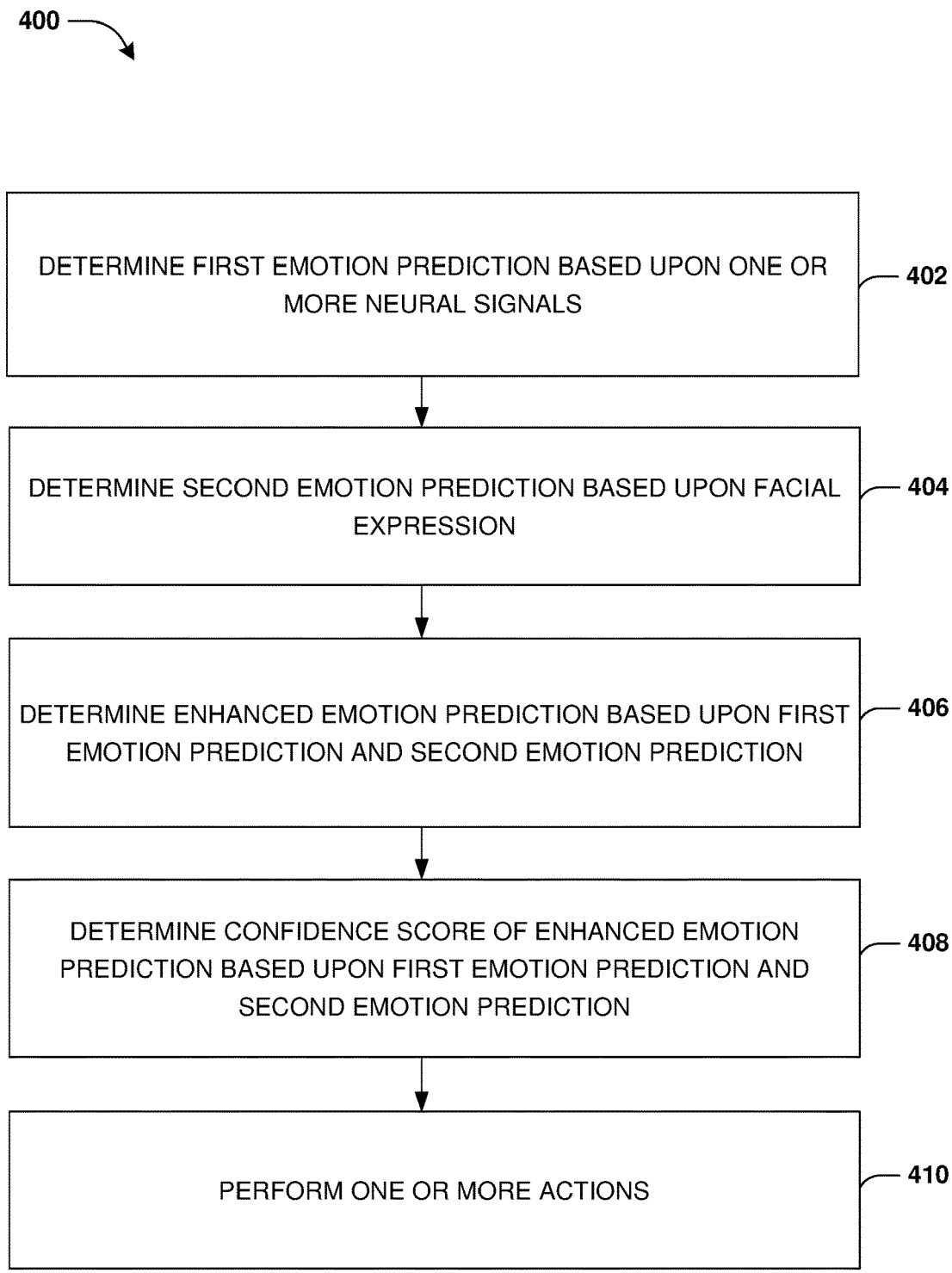
FIG. 4 is a flow chart illustrating an example method for determining emotion predictions and/or confidence scores in accordance with an embodiment.

An embodiment of determining emotion predictions and/or confidence scores is illustrated by an exemplary method 400 of FIG. 4, and is further described in conjunction with the system 101 of FIGS. 1A-1E. At 402, a first emotion prediction (e.g., the BCI-based emotion prediction 108) associated with the first person may be determined based upon one or more neural signals (e.g., the one or more neural signals 104) collected via a BCI. At 404, a second emotion prediction (e.g., the FE-based emotion prediction 118) associated with the first person may be determined based upon a facial expression of the first person. At 406, an enhanced emotion prediction (e.g., the enhanced emotion prediction 124) associated with the first person may be determined based upon the first emotion prediction and the second emotion prediction. At 408, a confidence score (e.g., the confidence score 126) of the enhanced emotion prediction may be determined based upon the first emotion prediction and the second emotion prediction. For example, the enhanced emotion prediction may be determined based upon a comparison of the first emotion prediction with the second emotion prediction. At 410, one or more actions may be performed based upon the enhanced emotion prediction and the confidence score.

In some examples, whether to perform an action using the enhanced emotion prediction may be determined based upon the confidence score 126. For example, the action may be performed based upon a determination that the confidence score 126 meets (e.g., exceeds) the threshold confidence. Alternatively and/or additionally, the action may not be performed based upon a determination that the confidence score 126 does not meet (e.g., does not exceed) the threshold confidence.

In some examples, a type of action, an intensity of the action, etc. of the one or more actions may be based upon the confidence score 126. Alternatively and/or additionally, the one or more actions may change over time based upon changes to the confidence score 126. For example, as the confidence score 126 changes (e.g., increases or decreases), a type of action, an intensity of the action, etc. may be adjusted in proportion to the change to the confidence score 126. In an example, an intensity of an emotion output (e.g., an action of the one or more actions) may be a function of the confidence score 126 (e.g., a higher value of the confidence score 126 may correspond to an increased intensity of the emotion output).

The one or more actions may comprise controlling an avatar associated with the first person based upon the enhanced emotion prediction and the confidence score. The avatar may correspond to a graphical representation of the first person, a character associated with the first person (e.g., the character may correspond to a video game character controlled by the first person in a video game), and/or a persona of the first person. For example, the avatar may be representative of the first person. In some examples, the avatar may comprise a 2-dimensional or 3-dimensional graphical object. An avatar facial expression of the avatar may be controlled (e.g., updated) based upon the enhanced emotion prediction and the confidence score. For example, an avatar facial expression of the avatar may be determined based upon the enhanced emotion prediction and the confidence score, and the avatar may be rendered based upon the avatar facial expression.

Figure 5:
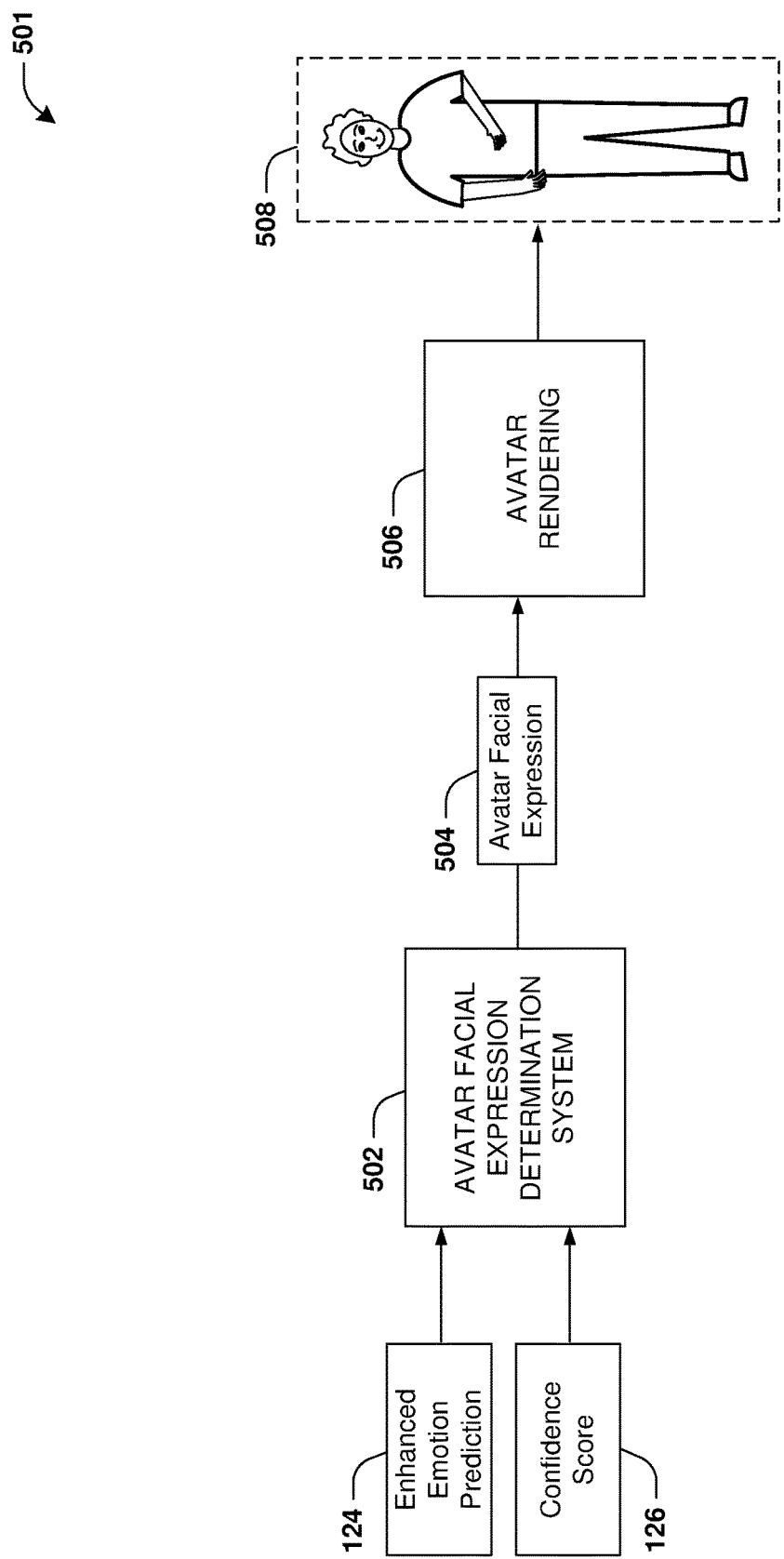
FIG. 5 is a diagram illustrating an example system for controlling an avatar according to some embodiments.

FIG. 5 illustrates an example of a system 501 for controlling the avatar (shown with reference number 508) associated with the first person, and is further described in conjunction with the system 101 of FIGS. 1A-1E. The enhanced emotion prediction 124 and/or the confidence score 126 may be input to an avatar facial expression determination system 502, which may determine the avatar facial expression (shown with reference number 504). The avatar facial expression 504 may be input to an avatar rendering module 506. The avatar rendering module 506 may render the avatar 508 based upon the avatar facial expression 504. The avatar 508 may be displayed on one or more client devices.

The avatar 508 may be rendered and/or displayed via at least one of a social media service (e.g., a social media platform may display the avatar 508 to one or more other users of the social media platform), a messaging service, a video game (e.g., the avatar 508 may be displayed in the video game as a representation of the first person to one or more other users playing the video game), a virtual reality service, an augmented reality service, a mixed reality service (e.g., the avatar 508 may be displayed by a virtual reality system, an augmented reality system and/or a mixed reality system to represent the first person in a virtual environment), etc.

In some examples, the enhanced emotion prediction 124 may be used to determine the avatar facial expression 504 and/or render the avatar 508 according to the avatar facial expression 504 based upon a determination that the confidence score 126 meets (e.g., exceeds) the threshold confidence. For example, in response to the confidence score 126 not meeting the threshold confidence, the avatar facial expression 504 may not be determined using the enhanced emotion prediction 124 and/or the avatar 508 may not be rendered based upon the avatar facial expression 504. The enhanced emotion prediction 124 and/or the confidence score 126 may be updated (e.g., re-determined using updated neural signals and/or updated facial expressions of the first person) in a continuous and/or periodic (or aperiodic) manner. Upon the confidence score 126 (e.g., an updated version of the confidence score 126 associated with an updated version of the enhanced emotion prediction 124) being set to a value that meets the threshold confidence, the avatar facial expression 504 may be determined using the enhanced emotion prediction 124 (e.g., the updated version of the enhanced emotion prediction 124), and the avatar 108 may be rendered based upon the avatar facial expression 504.

Alternatively and/or additionally, the confidence score 126 may be used to determine the avatar facial expression 504 and/or render the avatar 508. For example, an intensity of the avatar facial expression 508 may be a function of the confidence score 126, where an intensity of the avatar facial expression 508 may be accentuated based upon an increase of the confidence score 126 and/or may be decreased based upon a decrease of the confidence score 126. In an example in which the enhanced emotion prediction 124 corresponds to "angry", a level of anger expressed by the avatar facial expression 508 may be based upon the confidence score 126, wherein a higher value of the confidence score 126 may result in the avatar facial expression 508 having a visual expression corresponding to higher level of anger and/or a lower value of the confidence score 126 may result in the avatar facial expression 508 having a visual expression corresponding to a lower level of anger. For example, there may be multiple visual expressions of "angry" that may vary in intensity and may be used for different values of the confidence score 126.

In some examples, the one or more actions may comprise determining similarity information associated with a plurality of persons including the first person and one or more other persons. The plurality of persons may be participants of an event (e.g., a live event and/or a virtual event). The similarity information may be indicative of levels of similarity between persons of the plurality of persons. The levels of similarity may be determined using a machine learning model and/or artificial intelligence. The levels of similarity may be based upon emotions of the persons, environments of the persons, interests of the persons, and/or other information related to the persons. In an example, the similarity information may be indicative of a level of similarity between the first person and a second person of the plurality of persons. The level of similarity may be based upon a similarity score corresponding to a similarity between an emotion indicated by the enhanced emotion prediction 124 and an emotion associated with the second person (e.g., the similarity score may be determined using one or more of the techniques provided herein with respect to determining the first similarity score 214). In some examples, the similarity score (and/or the level of similarity) may be a function of the confidence score 126, where a higher value of the confidence score 126 may correspond to a higher value of the similarity score (and/or the level of similarity). In some examples, persons of the plurality of persons may be clustered into groups based upon the levels of similarity. For example, the first person may be included in a group with other persons that have levels of similarity (e.g., levels of similarity between the first person and the other persons) that exceed a similarity threshold. Group-specific content may be selected and provided to persons of the group (e.g., persons of the group may be provided with content selected independently from content selected for other groups) to provide a more personalized experience for persons of the group (e.g., a group of users who are determined to be "pleased" may be provided with first content, which may be different than second content that is provided to a group of users who are determined to be "bored").

In some examples, the one or more actions may comprise providing a representation of the enhanced emotion prediction 124 and/or the confidence score 126. In some examples, the representation of the enhanced emotion prediction 124 and/or the confidence score 126 may be provided in response to the confidence score 126 meeting the threshold confidence. The representation of the enhanced emotion prediction 124 and/or the confidence score 126 may be transmitted to and/or displayed via a second client device. In some examples, the representation may comprise text (e.g., "Happy, Confidence: 60%") and/or a graphical object (e.g., the avatar 508) indicating the enhanced emotion prediction 124 (e.g., "happy") and/or the confidence score 126 (e.g., 60%). Alternatively and/or additionally, the representation may comprise audio (e.g., speech) output via a speaker of the second client device.

In some examples, the representation may be displayed to a second user interacting and/or communicating with the first person (e.g., the first person and the second user may interact and/or communicate with each other via a social media platform, a messaging service, a video game, a virtual event, etc.). For example, the representation may be provided (e.g., displayed and/or output via a speaker) via a client device of the second user, and may enable the second user to determine the first person's emotion. In this way, even if the second user is not able to discern the first person's emotion (e.g., due to at least one of the second user not having access to video and/or audio of the first person, language and/or cultural barriers between the first person and the second user, etc.), the second user may determine the first person's emotion using the representation.

In an example, the first person may be a student in a class (e.g., a live in-person class and/or a virtual class), and the representation may be provided to (e.g., transmitted to and/or displayed on) a client device of a teacher of the class. For example, the representation may be provided to the client device of the teacher in response to a determination that the enhanced emotion prediction 124 corresponds to an emotion of a defined list of emotions (e.g., a list of negative emotions, such as tired, sleepy, bored, sad, angry, afraid, etc.). For example, the enhanced emotion prediction 124 corresponding to the emotion of the defined list of emotions may be reflective of the first person having an issue (e.g., difficulty understanding concepts). Providing the teacher with the representation (which may identify the first person, for example) may notify the teacher of the issue, thereby enabling the teacher to address the issue (e.g., explaining a concept to the first person).

In some examples, emotion predictions (e.g., enhanced emotion predictions) associated with one or more persons and/or confidence scores of the emotion predictions may be determined using one or more of the techniques provided herein with respect to determining the enhanced emotion prediction 124 and/or the confidence score 126. The one or more persons may be participants of an event (e.g., a concert, a class, a social event, a conference, etc.). The event may be a live (e.g., in-person) event. Alternatively and/or additionally, the event may be a virtual event (e.g., an event implemented via a virtual reality system, an augmented reality system, a mixed reality system, a virtual reality social platform, etc.) in which the one or more persons may participate in the event remotely (e.g., a user may participate in the event remotely using a client device such as a laptop, a phone, a wearable device, a virtual reality-capable client device, such as a virtual reality headset, etc.).

In some examples, an emotion data structure may be generated and/or maintained based upon the emotion predications and/or the confidence scores. For example, the emotion data structure may be updated (based upon detected emotion changes and/or confidence score changes, for example) continuously and/or in a periodic (or aperiodic) manner. In some examples, one or more features of the event may be controlled based upon the emotion data structure. In an example, avatars of the one or more persons (that represent the one or more persons in the virtual event) may be controlled (e.g., rendered) based upon the emotion data structure (e.g., an avatar of a person may be rendered based upon an emotion prediction and/or a confidence score associated with the person).

In some examples, the emotion data structure may be monitored to determine whether a first condition is met. In an example, the first condition may be associated with a first defined list of emotions. The first condition may be met when an emotion prediction associated with a person (and/or emotion predictions associated with a threshold quantity of persons) corresponds to an emotion of the first defined list of emotions. In an example, the first defined list of emotions may comprise negative emotions (e.g., tired, sleepy, bored, sad, angry, afraid, etc.). In response to a determination that the first condition is met, one or more actions associated with the event may be performed. The one or more actions may comprise (i) informing one or more administrators of the event that the first condition is met, (ii) selecting and/or providing content to participants of the event (e.g., the content may comprise a song, a video, informational and/or educational content, etc. that is categorized as exciting and/or that may be of interest to participants that are bored of other content previously provided in the event), (iii) the one or more threat response actions, and/or (iii) one or more other actions. In an example, it may be determined, based upon the first condition being met, that at least some of the participants are not interested in and/or do not enjoy content currently and/or previously presented to the participants in the event. The one or more actions may comprise ceasing to present the content, and selecting and/or providing new content (that is of interest to the participants, for example).

Alternatively and/or additionally, the emotion data structure may be monitored to determine whether a second condition, associated with a second defined list of emotions (e.g., a list of positive emotions, such as happy, excited, delighted, etc.) is met. The second condition may be met when an emotion prediction associated with a person (and/or emotion predictions associated with a threshold quantity of persons) corresponds to an emotion of the second defined list of emotions. In response to a determination that the second condition is met, content currently being presented to participants of the event may continue to be presented (e.g., the determination that the second condition is met may correspond to a determination that participants enjoy the content).

In some examples, at least some of the disclosed subject matter may be implemented on a client device, and in some examples, at least some of the disclosed subject matter may be implemented on a server (e.g., hosting a service accessible via a network, such as the Internet).

Figure 6:
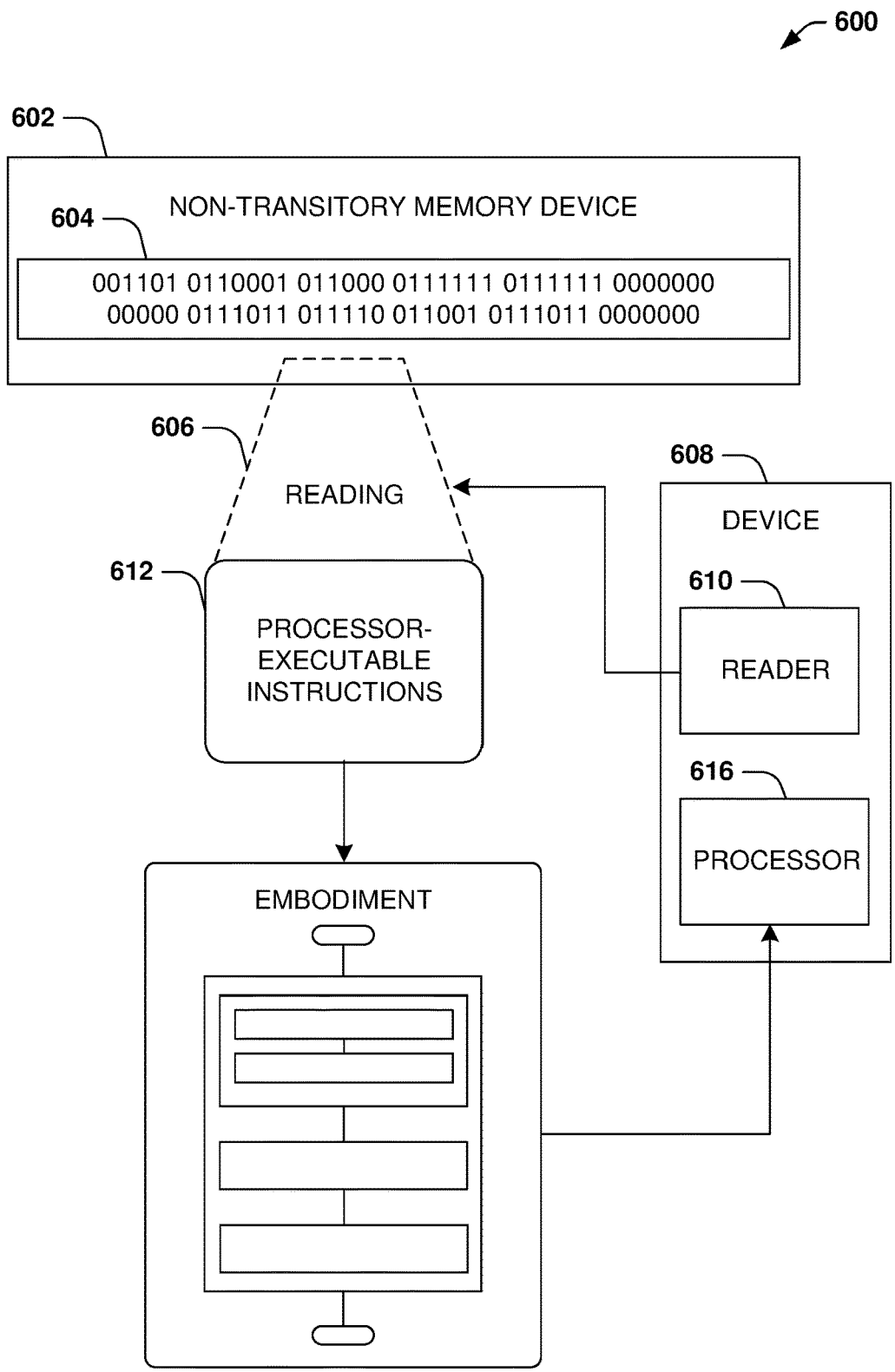
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the exemplary method 300 of FIG. 3 and/or the exemplary method 400 of FIG. 4, for example. In some embodiments, the processor-executable instructions 612 are configured to cause implementation of a system, such as at least some of the example system 101 of FIGS. 1A-1E, the example system 201 of FIGS. 2A-2E and/or the example system 501 of FIG. 5, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed is:

1. A method comprising:
determining, based upon one or more neural signals collected via a brain-computer interface (BCI), a first emotion prediction associated with a person;
determining, based upon a facial expression of the person, a second emotion prediction associated with the person;
determining, based upon the first emotion prediction and the second emotion prediction, an enhanced emotion prediction associated with the person;
determining a confidence score of the enhanced emotion prediction based upon the first emotion prediction and the second emotion prediction;
performing one or more actions based upon the enhanced emotion prediction and the confidence score;
determining a plurality of emotion predictions associated with a plurality of persons in a first area in which the person is located;
identifying, based upon the plurality of emotion predictions, a group propagation of emotion through at least some of the plurality of persons;
determining a propagation effect based upon whether the group propagation of emotion reached the person;
determining one or more neighbor emotion predictions associated with one or more persons in a second area in which the person is located, wherein the one or more persons are a subset of the plurality of persons;

determining an expected emotion of the person based upon the one or more neighbor emotion predictions;

comparing the enhanced emotion prediction with the expected emotion to determine a first similarity score; and in response to the propagation effect indicating that the group propagation of emotion reached the person and the first similarity score not meeting a similarity threshold:
  determining one or more environmental characteristics of an environment of the person;
  determining one or more environmental preferences of the person;
  determining a second similarity score based upon a comparison of the one or more environmental characteristics with the one or more environmental preferences; and
  modifying the confidence score based upon the second similarity score.

2. The method of claim 1, wherein determining the confidence score of the enhanced emotion prediction comprises:
  mapping the first emotion prediction to a first position in an emotion model;
  mapping the second emotion prediction to a second position in the emotion model; and
  comparing the first position with the second position.

3. The method of claim 1, further comprising:
  determining:
    an actor emotion prediction associated with an actor in an event in which the person is a participant, wherein determining the expected emotion of the person is based upon the actor emotion prediction.

4. The method of claim 1, wherein modifying the confidence score comprises:
  decreasing the confidence score based upon the second similarity score meeting a second similarity threshold.

5. The method of claim 1, wherein modifying the confidence score comprises:
  increasing the confidence score based upon the second similarity score not meeting a second similarity threshold.

6. The method of claim 1, further comprising:
  identifying, based upon the plurality of emotion predictions and the enhanced emotion prediction, a propagation of a threat emotion by the person to at least some persons of the plurality of persons, wherein performing the one or more actions comprises:
    in response to identifying the propagation of the threat emotion, at least one of:
      adjusting a camera to capture a view of the person.

7. The method of claim 1, wherein performing the one or more actions comprises:
  determining an avatar facial expression based upon the enhanced emotion prediction and the confidence score; and
  rendering, based upon the avatar facial expression, an avatar associated with the person.

8. The method of claim 1, wherein performing the one or more actions comprises:
  providing a representation of at least one of the enhanced emotion prediction or the confidence score.

9. The method of claim 1, wherein the one or more neural signals comprise at least one of:
  one or more electroencephalography (EEG) signals;
  one or more magnetoencephalography (MEG) signals; or
  one or more electrooculography (EOG) signals.

10. The method of claim 1, further comprising:
  identifying, based upon the plurality of emotion predictions and the enhanced emotion prediction, a propagation of a threat emotion by the person to at least some persons of the plurality of persons, wherein performing the one or more actions comprises:
    in response to identifying the propagation of the threat emotion, transmitting, to one or more devices, one or more threat alerts indicative of a location of the person.

11. A device, comprising:
a processor configured to execute instructions to perform operations comprising:
  determining, based upon one or more neural signals collected via a brain-computer interface (BCI), a first emotion prediction associated with a person;
  determining, based upon a facial expression of the person, a second emotion prediction associated with the person;
  determining, based upon the first emotion prediction and the second emotion prediction, an enhanced emotion prediction associated with the person;
  determining a confidence score of the enhanced emotion prediction based upon the first emotion prediction and the second emotion prediction;
  performing one or more actions based upon the enhanced emotion prediction and the confidence score;
  determining a plurality of emotion predictions associated with a plurality of persons in a first area in which the person is located;
  identifying, based upon the plurality of emotion predictions, a group propagation of emotion through at least some of the plurality of persons;
  determining a propagation effect based upon whether the group propagation of emotion reached the person;
  determining one or more neighbor emotion predictions associated with one or more persons in a second area in which the person is located, wherein the one or more persons are a subset of the plurality of persons;
  determining an expected emotion of the person based upon the one or more neighbor emotion predictions;
  comparing the enhanced emotion prediction with the expected emotion to determine a first similarity score; and
  in response to the propagation effect indicating that the group propagation of emotion reached the person and the first similarity score not meeting a similarity threshold:
    determining one or more environmental characteristics of an environment of the person;
    determining one or more environmental preferences of the person;
    determining a second similarity score based upon a comparison of the one or more environmental characteristics with the one or more environmental preferences; and
    modifying the confidence score based upon the second similarity score.

12. The device of claim 11, wherein determining the confidence score of the enhanced emotion prediction comprises:
  mapping the first emotion prediction to a first position in an emotion model;

mapping the second emotion prediction to a second position in the emotion model; and comparing the first position with the second position.

13. The device of claim 11, the operations further comprising:

determining:

an actor emotion prediction associated with an actor in an event in which the person is a participant, wherein determining the expected emotion of the person is based upon the actor emotion prediction.

14. The device of claim 11, wherein performing the one or more actions comprises:

determining an avatar facial expression based upon the enhanced emotion prediction and the confidence score; and rendering, based upon the avatar facial expression, an avatar associated with the person.

15. The device of claim 11, the operations further comprising:

identifying, based upon the plurality of emotion predictions and the enhanced emotion prediction, a propagation of a threat emotion by the person to at least some persons of the plurality of persons, wherein performing the one or more actions comprises:

in response to identifying the propagation of the threat emotion, transmitting, to one or more devices, one or more threat alerts indicative of a location of the person.

16. The device of claim 11, the operations further comprising:

identifying, based upon the plurality of emotion predictions and the enhanced emotion prediction, a propagation of a threat emotion by the person to at least some persons of the plurality of persons, wherein performing the one or more actions comprises:

in response to identifying the propagation of the threat emotion, adjusting a camera to capture a view of the person.

17. A non-transitory computer-readable medium storing instructions that when executed perform operations comprising:

determining, based upon one or more neural signals collected via a brain-computer interface (BCI), a first emotion prediction associated with a person;

determining, based upon a facial expression of the person, a second emotion prediction associated with the person;

determining, based upon the first emotion prediction and the second emotion prediction, an enhanced emotion prediction associated with the person;

determining a confidence score of the enhanced emotion prediction based upon the first emotion prediction and the second emotion prediction;

performing one or more actions based upon the enhanced emotion prediction and the confidence score;

determining a plurality of emotion predictions associated with a plurality of persons in a first area in which the person is located;

identifying, based upon the plurality of emotion predictions, a group propagation of emotion through at least some of the plurality of persons;

determining a propagation effect based upon whether the group propagation of emotion reached the person;

determining one or more neighbor emotion predictions associated with one or more persons in a second area in which the person is located, wherein the one or more persons are a subset of the plurality of persons;

determining an expected emotion of the person based upon the one or more neighbor emotion predictions;

comparing the enhanced emotion prediction with the expected emotion to determine a first similarity score; and in response to the propagation effect indicating that the group propagation of emotion reached the person and the first similarity score not meeting a similarity threshold:

determining one or more environmental characteristics of an environment of the person;

determining one or more environmental preferences of the person;

determining a second similarity score based upon a comparison of the one or more environmental characteristics with the one or more environmental preferences; and modifying the confidence score based upon the second similarity score.

18. The non-transitory computer-readable medium of claim 17, wherein performing the one or more actions comprises:

determining an avatar facial expression based upon the enhanced emotion prediction and the confidence score; and rendering, based upon the avatar facial expression, an avatar associated with the person.

19. The non-transitory computer-readable medium of claim 17, wherein performing the one or more actions comprises:

identifying, based upon the plurality of emotion predictions and the enhanced emotion prediction, a propagation of a threat emotion by the person to at least some persons of the plurality of persons, wherein performing the one or more actions comprises:

in response to identifying the propagation of the threat emotion, transmitting, to one or more devices, one or more threat alerts indicative of a location of the person.

20. The non-transitory computer-readable medium of claim 17, wherein performing the one or more actions comprises:

identifying, based upon the plurality of emotion predictions and the enhanced emotion prediction, a propagation of a threat emotion by the person to at least some persons of the plurality of persons, wherein performing the one or more actions comprises:

in response to identifying the propagation of the threat emotion, adjusting a camera to capture a view of the person.

* * * * *